United States Patent
Glasberg

(10) Patent No.: US 7,596,530 B1
(45) Date of Patent: Sep. 29, 2009

(54) METHOD FOR INTERNET PAYMENTS FOR CONTENT

(76) Inventor: Marcelo Glasberg, Rua Visconde de Piraja 357, apto 401 - Ipanema, Rio de Janeiro, RJ (BR) 22410-003

( * ) Notice: Subject to any disclaimer, the term of this patent is extended or adjusted under 35 U.S.C. 154(b) by 0 days.

(21) Appl. No.: 12/235,603

(22) Filed: Sep. 23, 2008

(51) Int. Cl.
*G06Q 99/00* (2006.01)
(52) U.S. Cl. .............................. 705/64; 705/65; 705/30; 705/44; 705/78; 705/79; 713/150
(58) Field of Classification Search ............. 705/50–79, 705/30–44; 713/150
See application file for complete search history.

(56) References Cited

U.S. PATENT DOCUMENTS

| 6,029,150 A | 2/2000 | Kravitz |
| 6,058,381 A | 5/2000 | Nelson |

OTHER PUBLICATIONS

A. Michael Froomkin, "The Essential Role of Trusted Third Parties in Electronic Commerce", Oct. 14, 1996.*

* cited by examiner

*Primary Examiner*—Jalatee Worjloh

(57) ABSTRACT

A method, in different embodiments, is provided to construct on-line, off-line, or hybrid internet payment systems that allow a vendor to sell physical or digital products or services to a user. The embodiments reduce transaction costs, facilitate implementation, help prevent fraud and solve privacy, trust, accountability and liability issues, in ways that may be specially suited to on-line micropayment systems. In one embodiment a vendor makes available some payment information to a user (100) and provides a ways to secure the payment information (500). A payment transaction is initiated (102) and payment is performed with the participation of a broker. The vendor may grant access to content to the user (109).

12 Claims, 9 Drawing Sheets

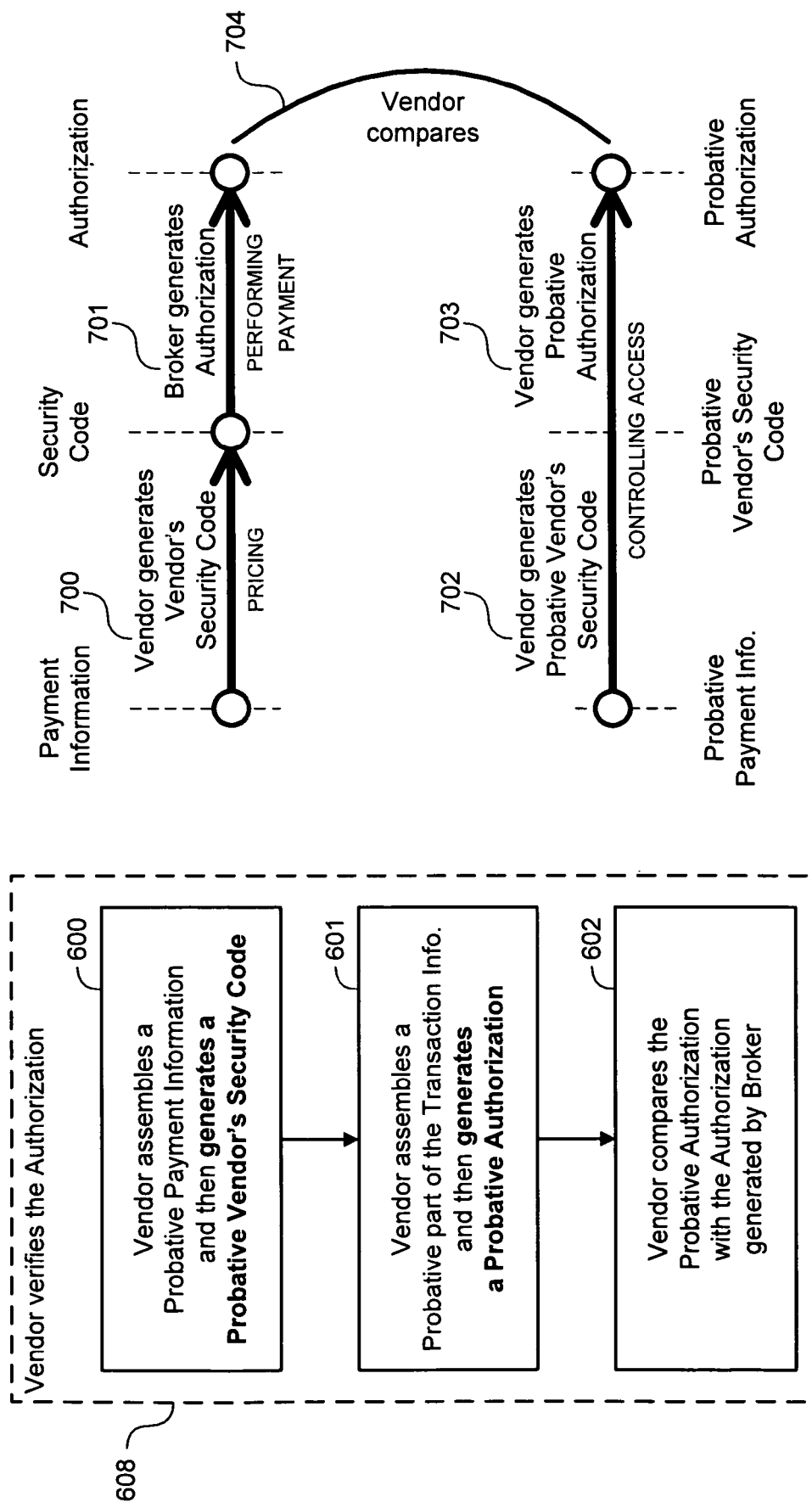

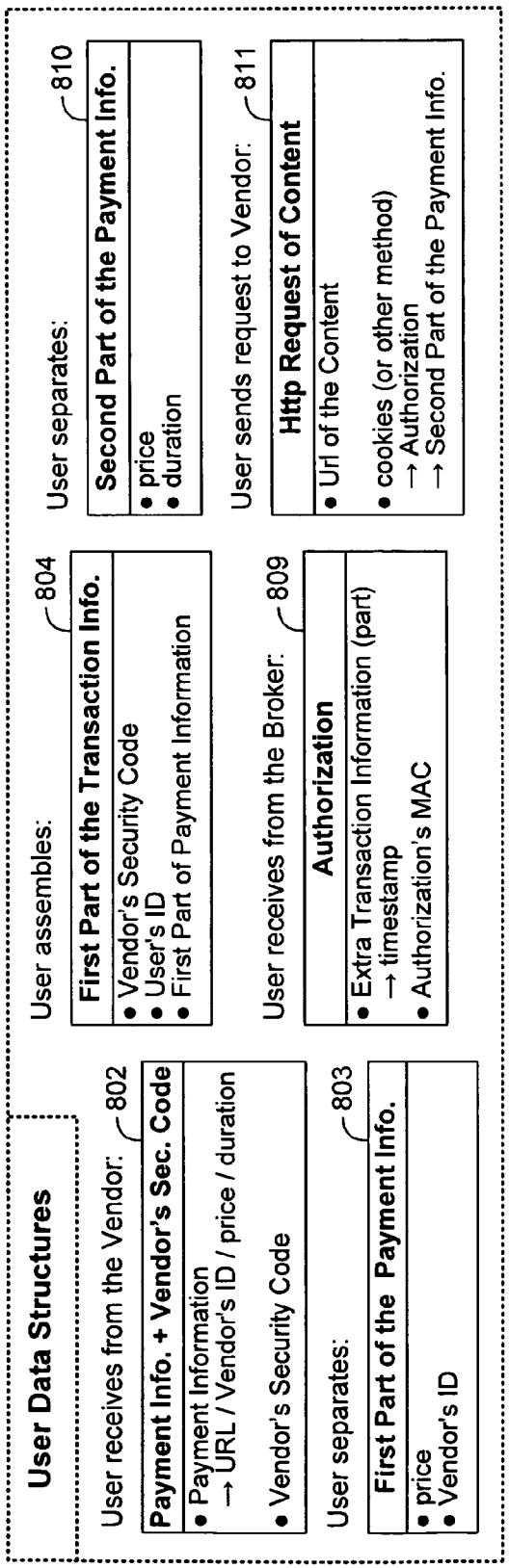
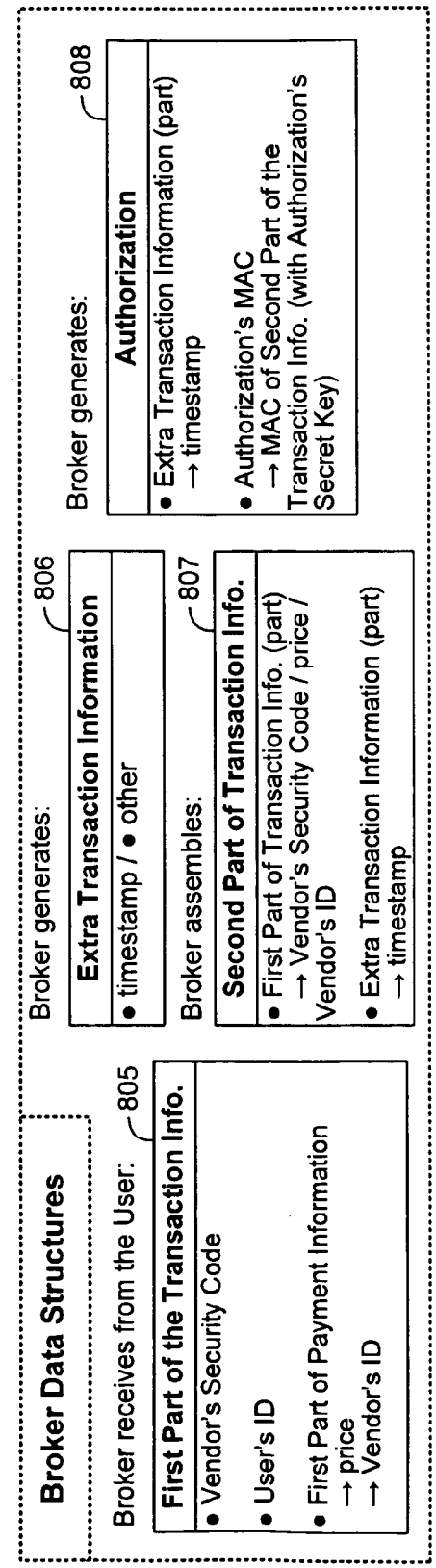
FIG. 8B
FIG. 8C

METHOD FOR INTERNET PAYMENTS FOR CONTENT

CROSS-REFERENCE TO RELATED APPLICATIONS

Not applicable

FEDERALLY SPONSORED RESEARCH

Not applicable

SEQUENCE LISTING OR PROGRAM

Not applicable

BACKGROUND

1. Field

Internet payments are usually required for vendors to grant user access to some content on the Internet.

2. Prior Art

Commerce on the Internet includes the sale of physical and digital products and services. The total amount to be paid for a single commerce operation is composed of many smaller costs, such as the cost of shipping, the cost of a payment transaction, plus some other costs. The term "payment transaction" includes the act of paying, when the money is transferred from a user to a vendor, usually with the help of a broker such as a bank or a credit card company. This money transfer usually costs something for the broker to perform, and that is called the cost of the payment transaction.

When selling physical products, such as books or CDs, it is necessary for the vendor to ship them to the buyer. The cost of shipping usually sets a minimum cost for the whole commerce operation, so that the total amount that the buyer must pay will never get very small. As a result, the cost of the payment transaction itself becomes negligible in comparison, and is not a critical factor.

However, the selling of digital products or services, such as digital music or videos, can, in most cases, be completely fulfilled through the Internet, without any shipping costs. In this case, the total amount that the buyer must pay may be indeed very small, and the cost of the payment transaction is not negligible. As an example, it may be acceptable for a vendor to spend 10 cents to complete a 15-dollar sale, but it is unacceptable to spend 10 cents to complete a 15-cent sale. When we realize that some content in the Internet may be sold for as little as one cent, or even less, it becomes apparent that transaction costs must be kept very small.

These very small payments are usually called micropayments. So, a suitable micropayment system must somehow minimize the transaction costs to make them economic for low value transactions. To minimize transaction costs, we must minimize the communication, processing, and data storage requirements placed on each part involved in the commerce operation, usually users, brokers, and vendors. In more detail, transaction costs are usually highly dependent upon the quantity of bytes of information to be sent and received by each party, upon the number of separate communication requests for each transaction, and upon the computational cost of processing the transaction, including time-consuming cryptographic and database operations.

A suitable micropayment system should also prevent fraud and minimize security risks, such as credit liability, credit abuse, counterfeiting, unauthorized withdrawal, purchase-order modification, double spending, failure to credit payment and failure of repudiation, among others. However, the goals of "minimizing transaction costs" and "preventing fraud" are sometimes contradictory because the more verification the vendor and the broker must do for a single payment transaction, the more expensive it becomes.

One of the most important fraud prevention requirements is that the system should guarantee that a user can only access some content after he or she has paid the exact amount the vendor asked for it (or after it is guaranteed that the user will pay). But, due to the way the Internet works, when a vendor includes payment information on a Web page, and this page is sent to the user's browser, it cannot be guaranteed that the user will not modify the HTML of the page (or other internal codes that result in modifying the payment information itself) before initiating payment. Therefore, when a payment occurs, the vendor or the broker must somehow determine if conditions, such as the price of the content, were not modified. A regular technique to do this is to compare the paid price to a list with prices of all the content for sale to make sure that the paid price matches the listed price.

The main disadvantage of this technique is that the price list must be consulted during the payment process to make sure the price and other conditions were not modified. This takes time and computational resources. And if the user has paid to access some content for a specific period of time, or for a specific number of times, then the vendor must keep track of the access rights of the user in order to know whether the user may still access the content without paying again. In this case, the price list may have to be verified over and over. This leads to more database operations and probably more communication overhead.

To minimize transaction costs, "off-line" payment methods have been proposed. Off-line methods do not require the participation of a broker (a trusted party) for every transaction, and usually only guarantee that fraud is detected when the vendor submit its transaction records to the broker, possibly at the end of the day. This is to be contrasted with "on-line" payment methods, which require the participation of a broker in every transaction and are secure against many types of fraud. Note that some texts refer to "on-line payments" as a synonym of "payments through the Internet", but this is not what we mean here when referring to on-line methods. Hybrid (partly off-line) methods also exist. But, for an off-line or hybrid method, it is usually more difficult to prevent fraud, and in fact most off-line systems proposed are not even designed to eliminate fraud, but rather only to maintain it below some defined threshold.

Very little has been done in recent years to improve on-line methods for making micropayments. A review of patents and scientific articles indicates that most of the research effort in the micropayment area has been directed to developing off-line or hybrid payment methods. For example, some methods are related to electronic elements associated with monetary value or units of credit, for instance, by using technologies like the so-called hash chains, or hash collisions (not discussed in this text; see Wikipedia: en.wikipedia.org/wiki/Hash_chain and en.wikipedia.org/wiki/Hash_collision), and strive to optimize probabilistic schemes. So, there is much less prior-art for on-line payment schemes where a broker is contacted in real-time and guarantees every transaction. As already pointed out, since on-line methods present fewer fraud risks, why is most of the recent research effort directed to improving off-line methods? A common argument states that on-line payment methods cannot be made more efficient than they are in the present state of the art, and, as a consequence, that resorting to off-line methods is the only way to further minimize transaction costs. For example, Mandadi, Ravi Kumar, (2006), in "Comparison of Current On-line Payment Technologies", Master thesis—Division of Information Theory—www.diva-portal.org/diva/getDocument?urn_nbn_se_liu_diva-7383-1_fulltext.pdf, page 45, states that "a number of payment systems, which need to contact a trusted third party during every payment have been proposed as micro on-line payment systems, but they are infeasible to handle large number of micro on-line payments as they need to contact the trusted party repeatedly". However, I believe this argument is wrong, and that the halt in studies for on-line micropayment methods should be lifted since the development of on-line payment systems with very low transaction costs would completely obsolete off-line methods.

When ascertaining which prior payment methods are pertinent, we first note that prior payment methods cover very different aspects of the problem. For example, some methods are about issuing, transmitting, accounting, or otherwise using electronic elements associated with monetary value or units of credit, which are exchanged, transmitted, or processed, to complete the payment operation. These elements can be called tokens, digital money, digital cash, electronic coins, electronic stamps, verifiers, e-coupons, sticks of currency, scrips of currency, electronic checks, or other. Some methods are about probabilistic pooling, so that payment information need not be checked for each transaction, while reducing security risks. Other methods are about details of creating electronic wallets or purses, or hardware (like smart cards or other intelligent devices), as to better store and exchange payment information. Others disclose the specifics of dealing with prepaid stored-value cards or stored-value accounts. Other methods are about reducing credit card commissions charged by credit card providers. Some methods are about direct use of credit cards without the need to send a credit card number to a vendor. Other methods relate only to specific mobile payment issues, in cases where payment must be made through mobile phones, PDAs, or other such devices. Some methods are about deciding if a payment is either a regular payment or a micropayment, and then suggest different ways of dealing with them. Others disclose ways to debit the user from his or her telephone account. Some relate to payments made only from ATM terminals, vending machines, or other hardware. Others disclose details of digital rights management (DRM) solutions. Others rely on creating spending limits for users. Others disclose new cryptographic techniques like hash functions or digital signatures. Some methods are about details of accounting systems, or ways for charging an Internet service provider or other service provider for the purchases made by its users. Others disclose methods for establishing centralized stores for selling content of other vendors. Some are concerned with techniques for implementing one-click purchases. Other relate to methods for issuing payments automatically based on user preferences, or methods for automating post-payment necessities, such as repudiation of payments by user-initiated complaints, so as to reduce the need of a call-center. The list goes on.

All of the previous listed aspects are important and can be used in particular payment systems, but prior-arts that discuss only these aspects are not relevant here since they do not define how payment information and information flow should be construed, organized or arranged, as to perform payment in efficient ways that are specially suited to on-line micropayment systems.

We will not however, exclude prior methods just because they are directed at normal valued payments (macro payments), instead of at micropayments. They are relevant because there is no inherent transaction cost limit that separates a method from being directed to micropayments or macro payments. Simply, when methods get more efficient, they can be used with smaller prices. For example, the PayPal payment system doesn't permit economical transactions of one cent and is not very efficient, but their market is mainly directed to normal-valued payments, which are less demanding. Most payment companies, online banks, and financial institutions use very similar on-line payment schemes that are not suited to micropayments.

In the text below, we will discuss some payment methods disclosed in real-world systems and also in patents. Each system uses different words to designate the same entities, but we will facilitate the comparison by converting them to the same consistent terminology, using the following capitalized words: User, Vendor, Broker, Payment Information, Price List, Confirmation, Authorization, and content. For brief definitions of these terms, see the Introduction of the Detailed Description.

One of the main disadvantages of the prior-art payment methods is the necessity for the Vendor (or for the Broker) to check a Price List of the content for sale during the payment process. In some payment systems, this Price List (or price catalog, or price table, or price database, or any other suitable name) resides on a Vendor's computer server, while in some others it resides on a Broker's computer server. This Price List is usually in the format of a data structure or database table, but can be in other formats. This Price List can be a collection of Payment Information of content or products for sale, or can be a collection of cryptographic hashes or some other derivatives of the Payment Information. Usually this Price List contains not only price information, but also conditions such as the duration of time that the User is allowed to access the content, and many other. The reason why this Price List must exist in these prior-art methods is that the Vendor or the Broker (when trusted by the Vendor) must verify that the prices and other conditions are met.

Prior-art payment methods present other disadvantages, and each one presents a different set of disadvantages. Some of these disadvantages will be briefly pointed out for each method. Note that, in the text below, when a payment method requires more communication between parts, i.e., whether there is a larger number of independent communications, whether there is more information to be sent (in bytes), then this is a disadvantage because of increased communication and processing burdens, resulting in increased transaction costs.

Consider a simple hypothetical payment method: A User has an account with a Broker. A Vendor maintains a Price List of the content it has for sale. The Vendor provides Payment Information to the User. The User initiates payment by sending to the Broker the Payment Information and a User's identification. The Broker discounts the User and sends back an Authorization. The User sends the Authorization to the Vendor and requests the content. The Vendor communicates with the Broker to ask if the Authorization is valid. The Broker confirms that the Authorization is valid. The Vendor checks the information in the Authorization against the Price List to check if the price and other conditions are correct. If so, the Vendor may grant access to the content to the User.

Some disadvantages of this method are: (i) the Vendor must maintain and check a Price List; (ii) the Broker has to receive the details of the Payment Information; (iii) when the User wants to access the content again during the Authorization's validity, the User has to contact the Broker again to get another Authorization, each time; and (iv) the Vendor has to communicate with the Broker to ask if the Authorization is valid.

Very similar to the simple method presented above are payment systems called Minitix, Wallie and Way2 Pay (see Robert Parhonyi, 2005, "Micro Payment Gateways", CTIT Ph.D.—thesis series no. 05-72, ISSN 1381-3617, ISBN 90-365-2239-0, The Netherlands, pages 264-269). In these systems, a User has an account with a Broker. A Vendor maintains a Price List of the content it has for sale. The Vendor provides Payment Information to the User. The User initiates payment by sending to the Broker the Payment Information and the User's identification. The Broker discounts the User, and then sends a Confirmation to the User and an Authorization to Vendor. The User contacts the Vendor and requests the content. The User may also send to the Vendor part of the Confirmation, or some User's identification, so that the Vendor can associate the User with the Authorization received from Broker. Then, the Vendor verifies the information of Authorization against the Price List to check if the price and other conditions are correct. If all is correct, the Vendor may grant access to the content to the User.

Some disadvantages of this method are: (i) the Vendor must maintain and check a Price List; (ii) the Broker has to receive the details of the Payment Information; (iii) when the User wants to access the content again during the Authorization's validity, the User may contact the Vendor directly, but the Vendor has to maintain a database of all the still valid Authorizations received from the Broker; and (iv) the Broker has to communicate with both the User and the Vendor, to send a Confirmation to the User, and an Authorization to the Vendor.

PayPal (see PayPal Company, 2006, "Order Management Integration Guide", USA, Chapter 3—Instant Payment Notification—pages 29 to 34, www.paypal.com/en_US/pdf/PP_OrderManagement_IntegrationGuide.pdf) and a payment system called Paynova (see "Micro Payment Gateways", already cited, in pages 272-273) also have payment methods are similar to the Minitix system. But, the PayPal system needs one more communication step between the Broker and the Vendor when the connection between them is not secure: the Vendor must send back to the Broker the Authorization it just received, so that the Broker can check to make sure it was not modified and to confirm the Authorization to the Vendor. The Paynova system also needs one more communication step between the Broker and the Vendor because when the User initiates payment by requesting Payment Information from the Vendor, the Vendor sends the Payment Information both to the User and to the Broker. Thus, when the User contacts the Broker, there is no need for the User to again send the Payment Information to the Broker.

Disadvantages of these methods are the same as in the Minitix system explained above, except for the added disadvantage of the extra communication step.

PaySafeCard (see "Micro Payment Gateways", already cited, in pages 270-271) has a payment system in which a User has an account with a Broker. The Vendor maintains a Price List of the content it has for sale. When the User initiates payment by requesting Payment Information from the Vendor, the Vendor sends Payment Information both to the User and to the Broker, so that when the User contacts the Broker, there is no need for the User to send again the Payment Information to the Broker. Then the Broker discounts the User and sends back an Authorization. When the User requests the content from the Vendor, the Vendor communicates with the Broker to ask if the User is authorized. The Broker confirms that the User is authorized, and the Vendor verifies the information of Authorization against the Price List to check if the price and other conditions are correct. If all is correct, the Vendor contacts again the Broker to ask it to execute the debit. Then the Vendor may grant access to the content to the User.

Some disadvantages of this method are: (i) the Vendor must maintain and check a Price List; (ii) the Vendor needs to send Payment Information both to the User and to the Broker, as to initiate payment; (iii) the Vendor must contact the Broker directly to check if the User has really paid; and (iv) the Vendor must contact the Broker once again to ask it to execute the debit.

U.S. Pat. No. 6,058,381 (Nelson, "Many-to-many payments system for network content materials", May 2, 2000) is an improvement over the methods presented above since it discloses a method that dispenses with the Vendor having to communicate directly with the Broker to receive an Authorization or to ask if the Authorization is valid. In this method a User has an account with a Broker. The Vendor maintains a Price List of the content it has for sale. A Vendor provides Payment Information to the User. The User initiates payment by sending to the Broker the Payment Information and the User's identification. The Broker discounts the User, digitally signs this information, generating an Authorization, and then sends the Authorization to the User. The User sends the Authorization to the Vendor and requests the content. The Vendor verifies the authenticity of the Authorization by verifying the Broker's signature. Then the Vendor verifies the information of Authorization against the Price List to check if the price and other conditions are correct. If all is correct, the Vendor may grant access to the content to the User.

Some disadvantages of this method are: (i) the Vendor must maintain and check a Price List; (ii) the Broker has to receive the details of the Payment Information; and (iii) when the User wants to access the content again during the Authorization's validity, the User has to contact the Broker again to get another Authorization, each time.

Very similar is a payment system called BitPass, now discontinued (see "Micro Payment Gateways", already cited, in pages 274-275). In this system, a User has an account with a Broker. A Vendor creates, in the Broker's computer server, a Price List of the content it wants to sell. The Vendor provides Payment Information to the User. The User initiates payment by sending the Broker the Payment Information and the User's identification. Then the Broker verifies the Payment Information against the Price List to check if the price and other conditions are correct. If the Payment Information is correct, the Broker discounts the User, digitally signs this information, generating an Authorization, and then sends the Authorization to the User. The User sends the Authorization to the Vendor and requests the content. The Vendor verifies the authenticity of the Authorization by verifying the Broker's signature. If all is correct, the Vendor may grant access to the content to the User. The main difference between this method and Nelson is that here the Broker verifies the Price List, instead of the Vendor.

Some disadvantages of this method are: (i) the Broker must maintain and check a Price List; (ii) the Broker has to receive the details of the Payment Information; and (iii) when the User wants to access the content again during the Authorization's validity, the User has to contact the Broker again to get another Authorization, each time.

U.S. Pat. No. 6,029,150 (Kravitz, "Payment and transactions in electronic commerce system", Feb. 22, 2000) adds another improvement since it discloses a method in which the Broker does not have to receive all of the details of the Payment Information. In this method a User has an account with a Broker and shares a secret key with it. The Vendor maintains a Price List of the content it has for sale. The Vendor provides Payment Information to the User, authenticated in a way that only the User can verify. The User initiates payment by sending to the Broker the Payment Information and the User's identification. The Payment Information may be cryptographically hashed so that the Broker doesn't need to receive all the payment details. The Broker discounts the User, digitally signs this information, generating an Authorization, and then sends the Authorization to the User. The User sends the Authorization to the Vendor and requests the content. The Vendor verifies the Authorization by verifying the Broker's signature and also by verifying the cryptographic hash of the Payment Information of the Authorization against the Price List. This is done to check if the price and other conditions are correct. If all is correct, the Vendor may grant access to the content to the User.

Some disadvantages of this method are: (i) the Vendor must maintain and check a Price List; (ii) there is the need for the User to share a secret key with the Broker; (iii) the Vendor must authenticate Payment Information specifically for each User; and (iv) all Parts must maintain databases.

Some disadvantages of this method are: (i) the Vendor must maintain and check a Price List; (ii) the Broker has to receive the details of the Payment Information; (iii) all the Vendor's content must pass through the Broker's computer servers, which not only imposes a huge communications burden for the Broker, but also is not secure for private data since anyone with free access to the Broker's system may read all the information the User receives; and (iv) when the User wants to access the content again during the Authorization's validity, the User has to contact the Broker again, and all the content must be delivered by the Broker itself, again.

ADVANTAGES

Accordingly, one or more embodiments may have one or more of the following advantages: (i) it is suited to both macro payments and micropayments; (ii) neither the Vendor nor the Broker need to maintain or check a Price List (even though they can, if desired); (iii) the Broker does not need to receive the details of the Payment Information, thus assuring privacy (even though it can receive it, if desired); (iv) when the User wants to access the content again during the Authorization's validity, the User may contact directly the Vendor, and does not need to contact the Broker again, each time (even though the Broker may be contacted each time, if desired); (v) the payment can be made fully on-line, performing complete real-time transactions (even though it can also be made off-line or partly off-line, if desired); (vi) it can be used with paid-links (but not necessarily); (vii) the parties need to exchange only a small amount of information to perform payment (even though they can exchange more, if desired); (viii) the vendor does not need to trust the broker; (ix) the broker does not need to check the payment information, thus it is very light on the broker; and (x) it permits construing payment systems that present very low transaction costs.

The listed advantages should not to be used to limit any aspect of any embodiment, since, in some embodiments, not all of these advantages must be present, and the embodiments may be used in combination with other techniques that relate to different payment advantages and disadvantages. Also, other advantages exist without being mentioned or are discussed within the rest of this text.

SUMMARY

This Summary is provided to introduce concepts in a simplified form that are further described below in the Detailed Description. This Summary is not intended to identify key or essential features of the claimed subject matter, nor it is intended to be used as an aid in determining the scope of the claimed subject matter.

A method, in different embodiments, is provided to construct on-line, off-line, or hybrid internet payment systems that allow a Vendor to sell physical or digital products or services to a User. The embodiments reduce transaction costs, facilitate implementation, help prevent fraud and solve privacy, trust, accountability and liability issues, in ways that may be specially suited to on-line micropayment systems. In one embodiment a Vendor makes available some Payment Information to a User and provides ways to secure the Payment Information. A payment transaction is initiated and payment is performed with the participation of a Broker. The Vendor may grant access to digital products or services, to the User.

DRAWINGS

The features and advantages of the embodiments will be better understood from the Detailed Description read in light of the accompanying drawings, which are briefly described just below and are more fully described later:

Figure 4A:
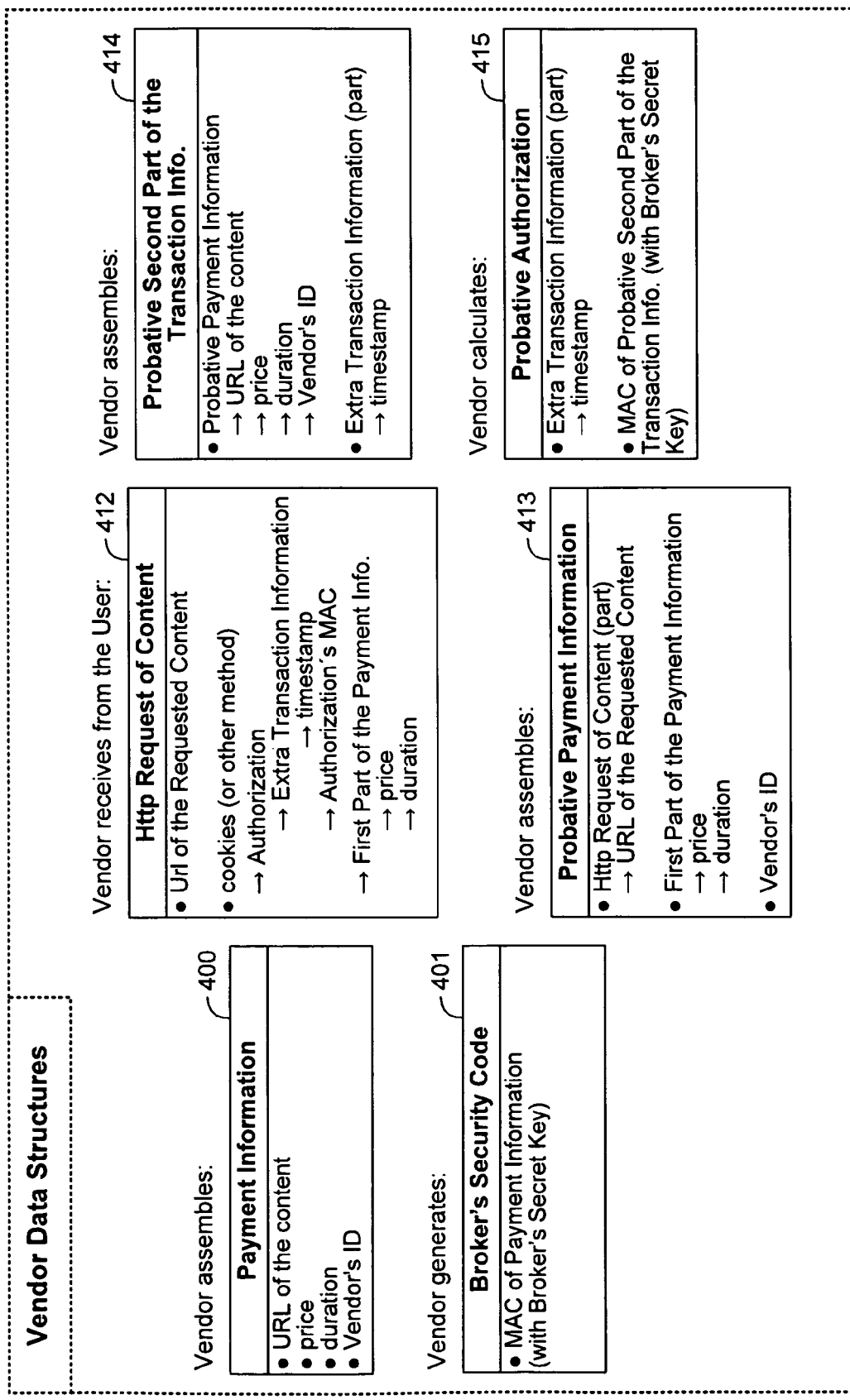
Figure 4B:
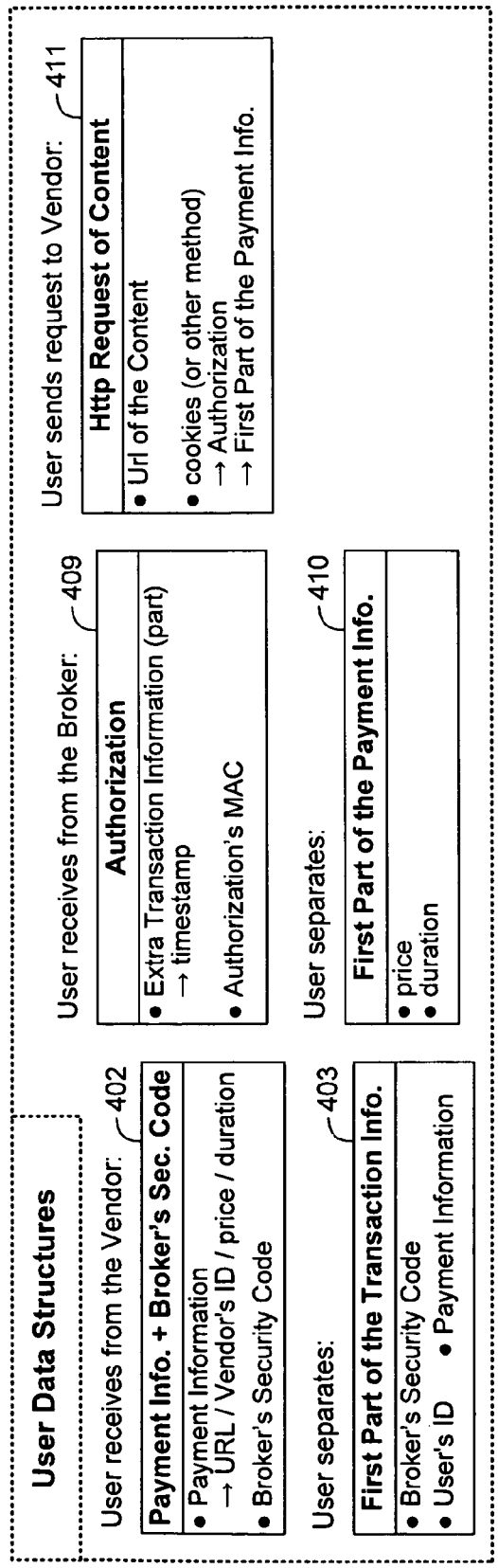
Figure 4C:
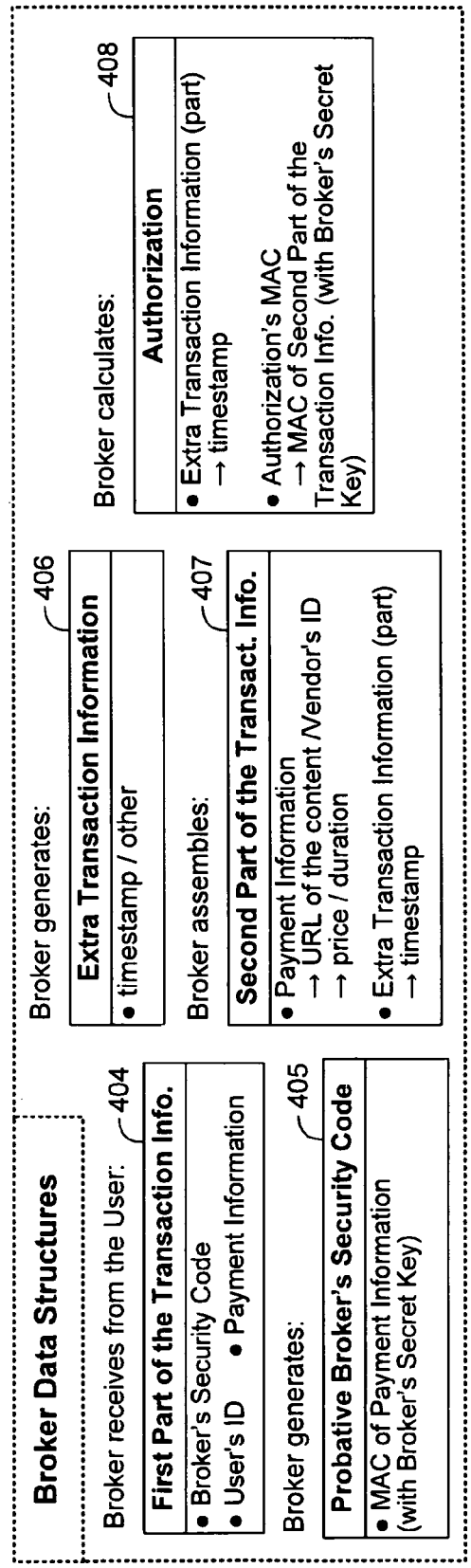

FIGS. 4A, 4B and 4C show data structures that can be used in a first embodiment. FIG. 4A shows Vendor Data Structures; FIG. 4B shows User Data Structures; and FIG. 4C shows Broker Data Structures. These figures are related to FIG. 1.

Figure 5:
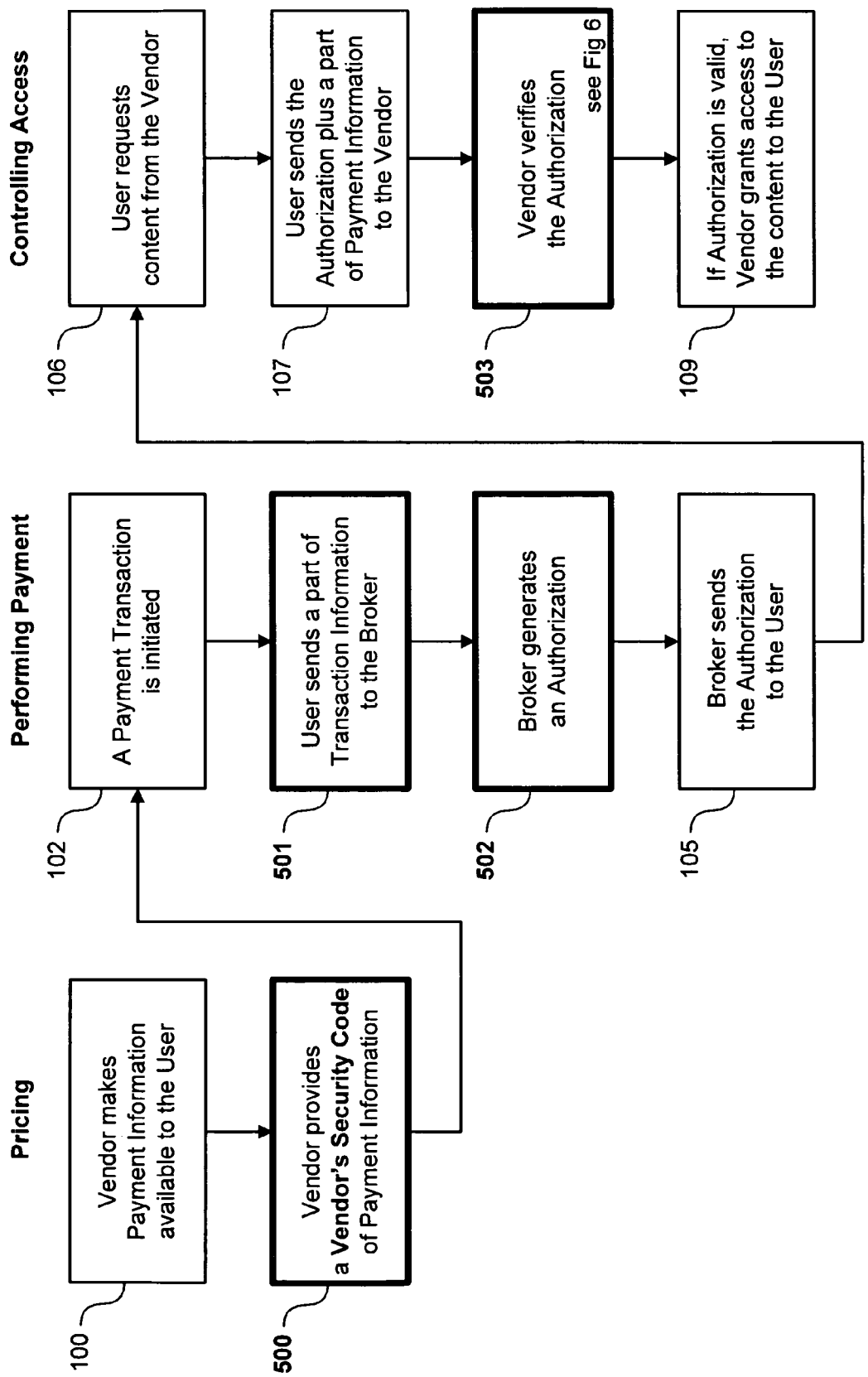

FIG. 5 is a diagram illustrating some aspects of pricing, performing payment, and controlling access, according to the preferred embodiment.

FIG. 6 is a diagram illustrating some aspects of how the Vendor can verify the Authorization, in the preferred embodiment. This figure is related to FIG. 5.

FIG. 7 is a diagram illustrating, in simplified form, some aspects of how, in the preferred embodiment, the Vendor's Security Code and the Authorization work together as to permit the Vendor to control content access. This figure is related to FIG. 5.

Figure 8A:
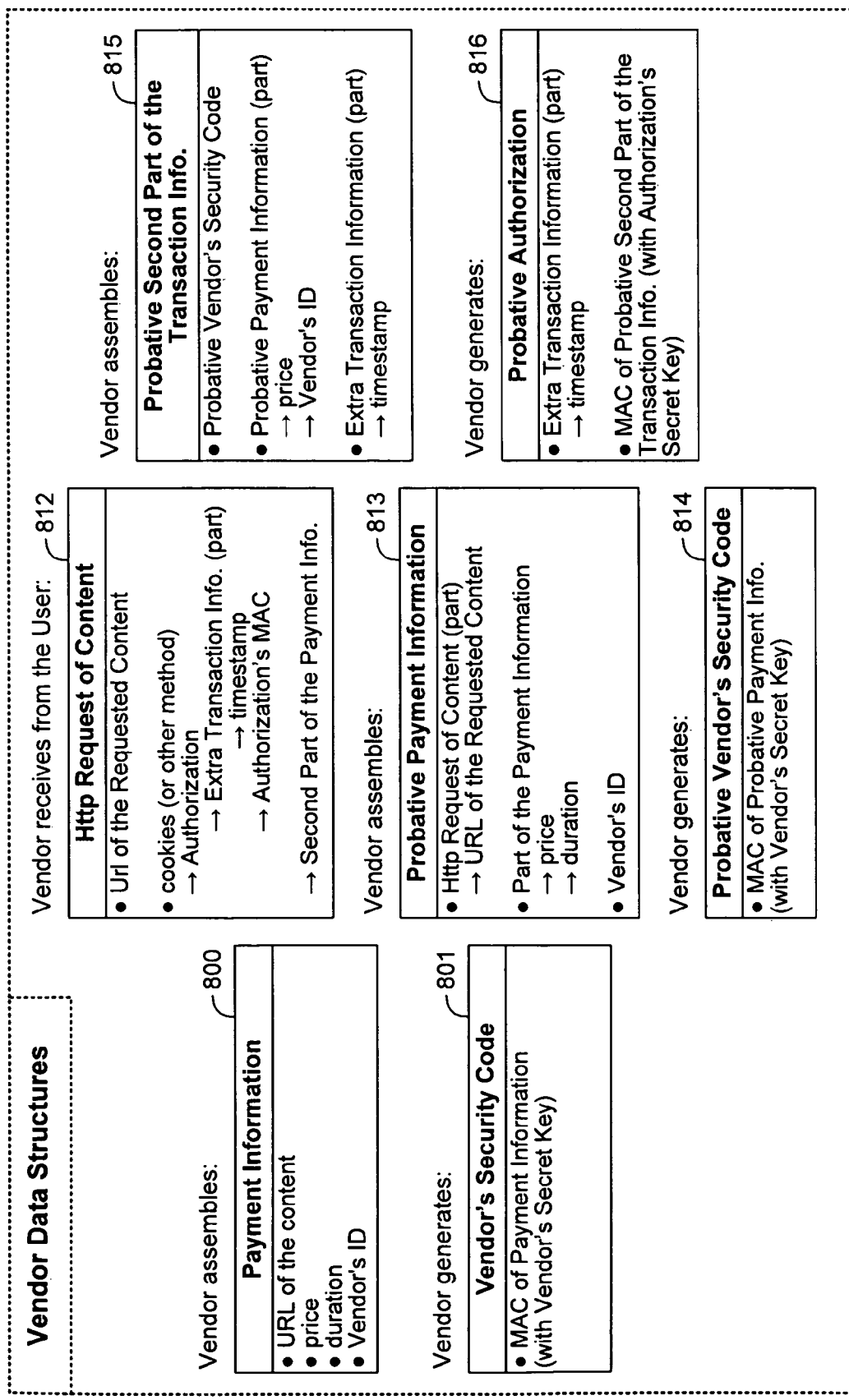

FIGS. 8A, 8B and 8C show data structures that can be used in the first embodiment. FIG. 4A shows Vendor Data Structures; FIG. 4B shows User Data Structures; and FIG. 4C shows Broker Data Structures. These figures are related to FIG. 5.

The same numbers are used throughout the disclosure and figures to reference the same steps, structures and features. For the sake of brevity, conventional data networking, application development, components of the individual operating components of the systems, and other functional aspects of the systems are not described in detail since these are well known to those skilled in the art. Many alternative or additional functional relationships or physical connections may be present in a practical system.

DETAILED DESCRIPTION

Introduction

Usually, three parties participate on a regular internet payment operation: the "User" (Customer, Buyer, Spender, Payer, or Purchaser), the "Vendor" (Merchant, Seller, Earner, or Payee), and the "Broker" (Guarantor, or Intermediary). To simplify things, the present text refers to the User as a person, and to the Vendor and the Broker as separate entities, usually companies. The Vendor is the one that owns or controls the content, and the Broker is the trusted party (usually a financial intermediary) who has the means to debit the User and credit the Vendor. Any variations of these definitions can exist. For example, there can be, simultaneously, a plurality of Users, Vendors, and Brokers. Or the Broker and the Vendor can be the same entity, for example if a web site runs a payment system for its own Users. Or more than one company can each perform a part of the tasks that constitute what is here called the Broker. Or the Vendor can sell authorized content of others, or some content may belong to more than one Vendor. Therefore, the present text refers to these parties in a simplified manner, for explanation reasons, and many variations of the definition of the terms User, Vendor and Broker are possible.

The terms "Broker" and "Vendor" are to be considered interchangeable in some situations where the Broker performs some of the tasks that are usually performed by the Vendor. For example, in payment systems where the Broker provides or runs the software technology to grant access to the User, the expression "the Vendor may grant access to the User" may in fact mean that "the Broker may grant access to the Vendor's content to the User".

Also, when referencing the User, Vendor, and Broker in the present text, in reality these are the computers, mobile phones, PDAs, browser software, server software, or other piece of software and hardware that perform the specified action in behalf of the party. For example, the expression "the User sends information", depending on the context, means "the web browser software running JavaScript code or plug-in on the User's computer sends information", or the like. This simplification is common in technical texts, including patents, and it helps understanding and using the embodiments.

The term "internet payment operation" includes the steps of pricing the content, performing payment, and controlling the access to the content.

The term "Transaction Information" is all information used or generated by parties when performing the payment transaction. Usually, some Transaction Information is sent, received, assembled, or somehow used during the payment transaction. Usually not all the Transaction Information is used at all the times as a whole, so it is possible to refer to the Transaction Information as some specific purpose assembly of a part of the Transaction Information. Especially when describing data structures in more detail, different parts of the Transaction Information will be separated. Then, just for referring purposes and to make clear which data structures go inside as components of other data structures, these parts will be given specific names like, for example, "First Part of the Transaction Information", or "Second Part of the Transaction Information", or "Extra Transaction Information".

The term "Payment Information" means the information supplied by the Vendor that specifies how much is to be paid (for example the price), plus some other information regarding the access to be granted (for example how many times or for how long the User can access the content), or any other conditions the Vendor first defines and wants to verify later. This may also include information about the Vendor itself (for example a Vendor's identification). However, the exceptions are the "Broker's Security Code" and the "Vendor's Security Code" (explained later), which are not here considered part of the Payment Information, but rather related to the Payment Information. Also note that, as for this definition, the User's identification is not part of the Payment Information.

The term "User's identification", or "User's ID", is the information that tells the Broker from where to discount money, credits, points, or other acceptable value, as to credit the Vendor. This may be a login and a password or any other acceptable way to identify a User, or a User's account, or a User's credit provider, or simply an anonymous prepaid card number or store-value account, among others. So the term "User's ID" doesn't need to mean, necessarily, identification of the User as a person or a company itself, but rather of a suitable resource related to the User or possessed by the User. Accordingly, when saying that the Broker discounts the User, it means it discounts a User's account, or a User's credit provider, or simply a User's anonymous prepaid card number, or a User's store-value account.

The term "Vendor's identification", or "Vendor's ID", is the information that tells the Broker to where credit the money, credits, points, or other acceptable value that was discounted from the User. This may be a Vendor's number, or any other acceptable way to identify the Vendor, or a Vendor's account, or a Vendor's credit provider, or simply an anonymous account, among others. Sometimes the Vendor's ID may be inferred from the identification of the content, for example when the identification of the content is a URL, and the Vendor is the owner of this URL domain. So the term "Vendor's ID" doesn't need to mean, necessarily, an identification of the Vendor as a person or a company itself, but rather of a suitable resource related to the Vendor or possessed by the Vendor.

The term "Authorization" is a piece of information that a first party issues, as to tell a second party that the first party authorizes some operation. Usually, an authorization can be somehow authenticated by the second party. For example, the Broker can issue an Authorization telling the Vendor to grant access to the User; or the User can issue an Authorization telling the Broker to credit the Vendor.

The term "Confirmation" is a piece of information that the Broker sends to the Vendor or to the User as to confirm or negate some operation (or to confirm or negate that an Authorization was held valid). When some operation is confirmed, it means it received a positive Confirmation. When some operation is negated, it means it received a negative Confirmation.

The term "content" is the digital products or services in a communications network. Therefore, content may include texts, images, music, data streams, videos, email, chat, news, financial information, reference information, voice over IP, blogs, social networks, discussion groups, software downloads, search engines, communications services, computer software, electronic games, digital maps, electronic tickets and receipts, and whatever other kind of digital information that can be communicated electronically. The expression "grant access to the content" may mean that the User is allowed to download, view or use the content, but may also mean that the content is delivered to the User. Only for the sake of brevity, the present text and drawings may refer only to "content" in expressions like "requesting the content", or "granting access to the content"; however, most embodiments also apply to physical products, so these expressions should be understood as saying "requesting the content or the physical products", or "granting access to the content or delivering the physical products".

In this text, the expressions "some information plus another" and "add some information to another", mean the elements are concatenated in a suitable way, for example, written one after the other, or otherwise joined in some kind of structured data. These expressions don't mean the elements are numerically added.

All discussed embodiments can be used in the Internet, but may also be used in any other electronic communications network, such as an extranet, a point of sale device, a personal digital assistant, a cellular phone, a kiosk, a satellite communications network, a mobile or wireless communications network, a local area network (LAN), a wide area network (WAN), networked or linked devices, or any other suitable network.

To click on a link is the main way Users acquire content over the Internet. During navigation, most of the content a User accesses by clicking on a link is free. However, when content is not free, it may also be natural for the User to pay for the information when clicking the link that requires the content's delivery. These special links may be called "paid-links", or "per-fee-links" or "pay-per-links". A User usually clicks dozens of links per hour, but, in return for each link clicked, receives only relatively small quantities of information (a typical web page contains only some 150 KB of information). As small quantities of information usually don't cost much, the prices for each paid-link should be small, and the payment process should occur very quickly, so that the User is encouraged to make a large number of purchases.

An organization called The World Wide Web Consortium, or W3C, in a Working Draft called "Common Markup for micropayment per-fee-links" (25 Aug. 1999—www.w3.org/TR/1999/WD-Micropayment-Markup-19990825/), has proposed a way to include Payment Information directly as attributes in the HTML (Hypertext Markup Language) of paid-links. Most embodiments here work well with paid-links similar to the one proposed by the W3C draft. But the paid-links don't need to be real HTML links (anchor tags), i.e., they can be buttons, images, texts, or another suitable HTML elements that perform some action when clicked. For example, the action may be downloading, displaying, or executing some content, or performing any other operation for which the Vendor wishes to charge the User a specific price for accessing. Throughout this text, this broad definition should be kept in mind when referring to paid-links. And although most embodiments can be used with paid-links, they are generic enough as to work well with other completely different ways to include or provide Payment Information that do not use the paid-link concept.

The term "Message Authentication Code", or "MAC", is a few bytes of information used to authenticate a suitable message, a string of information. There are many different types of MAC algorithms, and they are extensively used in computer security. It works like this: we start by choosing a secret key, which is usually just a few random bytes of information that we need to keep secret. The MAC algorithm itself doesn't need to be kept secret, but only the key. When a user inputs a secret key and some message (e.g., a text) to a MAC algorithm, it generates a few bytes of output. These few bytes of output are the "MAC of the message", or simply the "MAC". It is also common to use the word MAC as a verb, like for example "to MAC a message", or "MACing a message". Whenever one uses the same secret key and the same message again, the MAC algorithm will always output the same MAC.

The MAC algorithm is a one-way function; this means that it is impossible, in practice, to compute the original message from its MAC. It is also impossible to discover the secret key by just analyzing any pairs of messages and MACs. So, if two persons share a secret key that only they know, here is how one of them can send an authenticated message to the other: the first person writes the message and then generates its MAC by using the MAC algorithm and the secret key. The first person sends both the message and the MAC to the second person; the second person takes the message and generates his or her own MAC of the message, with the same MAC algorithm and with the same secret key. If the MAC generated by the second person matches the MAC sent by the first person, it means that the message was really created by the first person and was not modified after that. This is so because only these two persons know the secret key, so only they could have generated the exact same MAC of the same message. Of course, if more than two persons know the secret key, there is no way of assuring which one of them generated the message.

In other words, a MAC algorithm accepts, as input, a secret key and some arbitrary-length information to be authenticated, and outputs a MAC. The MAC value protects both the information's integrity as well as its authenticity by allowing verifiers who also possess the secret key to detect any changes to the information content. Many different types of MAC exist. A suitable type of MAC to use here is a HMAC, which is well known by those skilled in the art. And two recommended HMACs are the "HMAC-SHA1" or the "HMAC-SHA256", because these are very fast and secure MACs to perform, easy to implement, regularly present on popular Java and Microsoft software libraries, and generate, respectively, only 20 and 32 bytes (160 and 256 bits). But, in fact, one can use here almost any type of MAC, as long as its cryptographic properties are considered safe enough by the Vendor and the Broker. Explanations about MAC can be found on the Wikipedia at en.wikipedia.org/wiki/Message_Authentication_Code, or at Schneier, Bruce (1996), "Applied Cryptography", 2nd. ed., John Wiley and Sons Inc., pages 455-459. Explanations of HMACs can also be found at "HMAC: Keyed-Hashing for Message Authentication" (1997), at www.ietf.org/rfc/rfc2104.txt, and at the Wikipedia, at en.wikipedia.org/wiki/HMAC. Explanations of SHA algorithms can be found at FIPS PUB 180-2, "Secure Hash Standard" (2002), at csrc.nist.gov/publications/fips/fips180-2/fips180-2.pdf.

The term "Digital Signature" is a few bytes of information generated from a message by means of asymmetric keys. Explanations about asymmetric key cryptography can be found at the Wikipedia: en.wikipedia.org/wiki/Public-key_cryptography. One example of a suitable algorithm for performing Digital Signatures is the RSA Algorithm (the letters RSA are the initials of the surnames of the inventors of this algorithm. See PKCS #1: RSA Cryptography Standard, at www.rsa.com/rsalabs/node.asp?id=2125). The main difference between a Digital Signature and a MAC is that, in the MAC, every person that knows the single secret key can both generate and verify the MAC. However, the Digital Signature actually employs two different keys, one "private key" to generate the Signature, and another different "public key" to verify the Signature. The public key can be, as the name implies, disclosed to everyone. That's why its related algorithms are also called "Public Key Algorithms". So, in the Digital Signature, there can be someone who is capable of verifying some Signature, without being capable of generating it (or faking it).

First Embodiment

Figure 1:
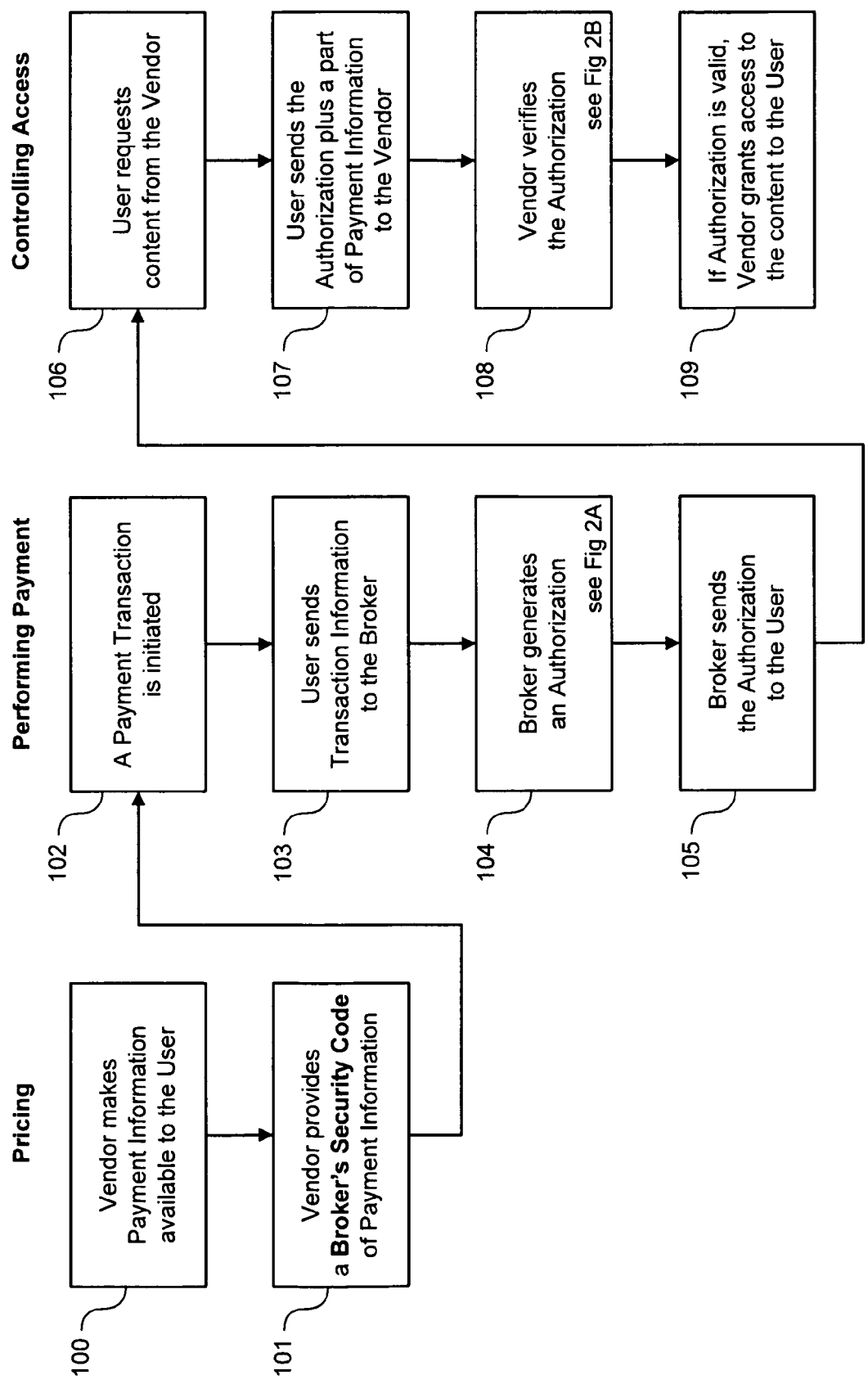
FIG. 1 is a diagram illustrating some aspects of pricing, performing payment, and controlling access, according to a first embodiment.

This explanation separates the steps of: (i) Pricing; (ii) Performing Payment; and (iii) Controlling Access. FIG. 1 is a diagram illustrating these steps, for the first embodiment. These steps are discussed seriatim below.

First Embodiment

Pricing

In order to sell content, a Vendor will usually start by making available, through the Internet or other networks, web pages containing links, buttons, or other suitable HTML elements that perform some action when clicked, for example downloading, displaying or executing some content, or performing any other operations, therefore "accessing the content". Suppose the Vendor wishes to charge some User a specific price for accessing the content. The Vendor then makes Payment Information available to the User (step 100).

As an example of making such Payment Information available, suppose the Vendor establishes a paid-link that points to a document called test.asp, located on the root directory of www.example.com. If the paid-link costs 10 cents, and gives access to the document for 10 minutes, then its HTML can be: <a href="www.example.com/test.asp" price="0.10USD" duration="10 min" vendorID="0002345">click here</a>.

Note that "href" is a standard HTML attribute of the anchor tag <a>, while "price", "duration" and "vendorID" are special attributes that are defined by the payment system. The quantity of attributes, their names, and their exact syntax is unimportant for this discussion. The Payment Information can be included in an alternative manner than by paid-links, but all information the Vendor will want to verify later should be included.

However, the Payment Information alone is not secure since once the User receives the web page, the User can modify its HTML as to change any of its details, for example by reducing the price to one cent, or increasing the duration to 20 hours. To prevent (or at least detect) any modification by the User (or by some third party) to the Payment Information, the Vendor must here provide another piece of information: a Broker's Security Code (step 101). The Broker's Security Code will protect both the Payment Information's integrity as well as its authenticity by allowing the Broker to detect any changes to the Payment Information and to confirm that the Payment Information and the Broker's Security Code were indeed created by the Vendor (or by the Broker on behalf of the Vendor).

The Broker's Security Code can be a cryptographic MAC. Remember a MAC is generated by using a secret key. If only the Broker and the Vendor know the secret key, only one of them could have generated the exact same MAC of the same message. Of course, if more than the two parties knew the secret key, there would be no way of assuring who generated the message, so that is why, in the first embodiment, the secret key must be kept secret both by the Vendor and the Broker.

In summary, a Broker's Security Code should be provided for the Payment Information, and in the first embodiment this means generating a MAC of the Payment Information, using a Broker's secret key defined and kept secret by the Broker and the Vendor. This Broker's secret key should not be disclosed to anyone else. If using paid-links, the Vendor may include the Broker's Security Code as an HTML attribute of the link.

While the Broker's secret key must, as the name says, be kept secret, the Broker's Security Code of the Payment Information is public, and may be included on the web page with the Payment Information. The Broker's Security Code of some particular Payment Information may be the same for all Users; i.e., it doesn't need to be user-specific, so that it can be hardcoded directly on a Web page, for example. However, if desired, it is also possible to generate or to write the Broker's Security Code in real-time through ASP (Active Server Pages, see Wikipedia: en.wikipedia.org/wiki/Active_Server_Page), ASP.NET (see Wikipedia: en.wikipedia.org/wiki/Asp.net), CGI technology (Common Gateway Interface, see Wikipedia: en.wikipedia.org/wiki/Common_Gateway_Interface), Java Servlets (see Wikipedia: en.wikipedia.org/wiki/Servlet), JSP (JavaServer Pages, see Wikipedia: en.wikipedia.org/wiki/JavaServer_Pages), or the like, and it can be user-specific.

By using the Broker's Security Code, the Payment Information becomes more secure since the User, although capable of modifying the Payment Information, is incapable of creating a suitable Broker's Security Code for some modified Payment Information. This is so because the User does not know the Broker's secret key. As we will see later, in the first embodiment, if the User creates a fake Broker's Security Code using any other key, the Broker will know that it is not compatible with the Payment Information, and will not accept the transaction.

In our terminology, when the Vendor makes Payment Information and its related Broker's Security Code available, we consider that this occurs before the Payment Transaction itself, i.e., we consider that the Payment Transaction itself is not yet initiated. As a disclaimer, if one considers that the act of making this information available is already part of the Payment Transaction, this is just a question of terminology, and doesn't depart from the spirit and scope of the method.

As defined in the first embodiment, the pricing step, discussed above, is a relatively separate step from the other next steps of performing payment and of controlling access, since there is no need for a direct communication between the Vendor and the Broker during the payment itself. This means the Vendor simply makes the Payment Information and the Broker's Security Code available to the Users, and then awaits requests of content from a User who can provide a valid Authorization. Now let's discuss how things continue in the next step: Performing Payment.

First Embodiment

Performing Payment

Now suppose a Payment Transaction is initiated (step 102). Usually a Payment Transaction is initiated by the User, after he or she receives or accesses the Payment Information that was made available by the Vendor, and decides to pay the price specified by the Vendor to access the Vendor's content. If the Vendor uses paid-links, it can send the Payment Information embedded in the HTML of the paid-link on a web page that the User requests, as we have seen. And in this case, the User may initiate the Payment Transaction by simply clicking the link.

The User then sends some Transaction Information to the Broker (step 103), composed by the Broker's Security Code, plus a User's ID, plus all the Payment Information that the Broker needs to verify.

There are many different technical ways for the User to send this information to the Broker. For example, some JavaScript included on the Vendor's web page can send the information from the User to the Broker through an iframe (see detailed explanation on how to do this in "Remote Scripting With iframe" at developer.apple.com/internet/webcontent/iframe.html), or a plug-in (Flash or other) or ActiveX can handle this communication, or the information can be passed through regular GET or POST requests, among other ways.

Figure 2:
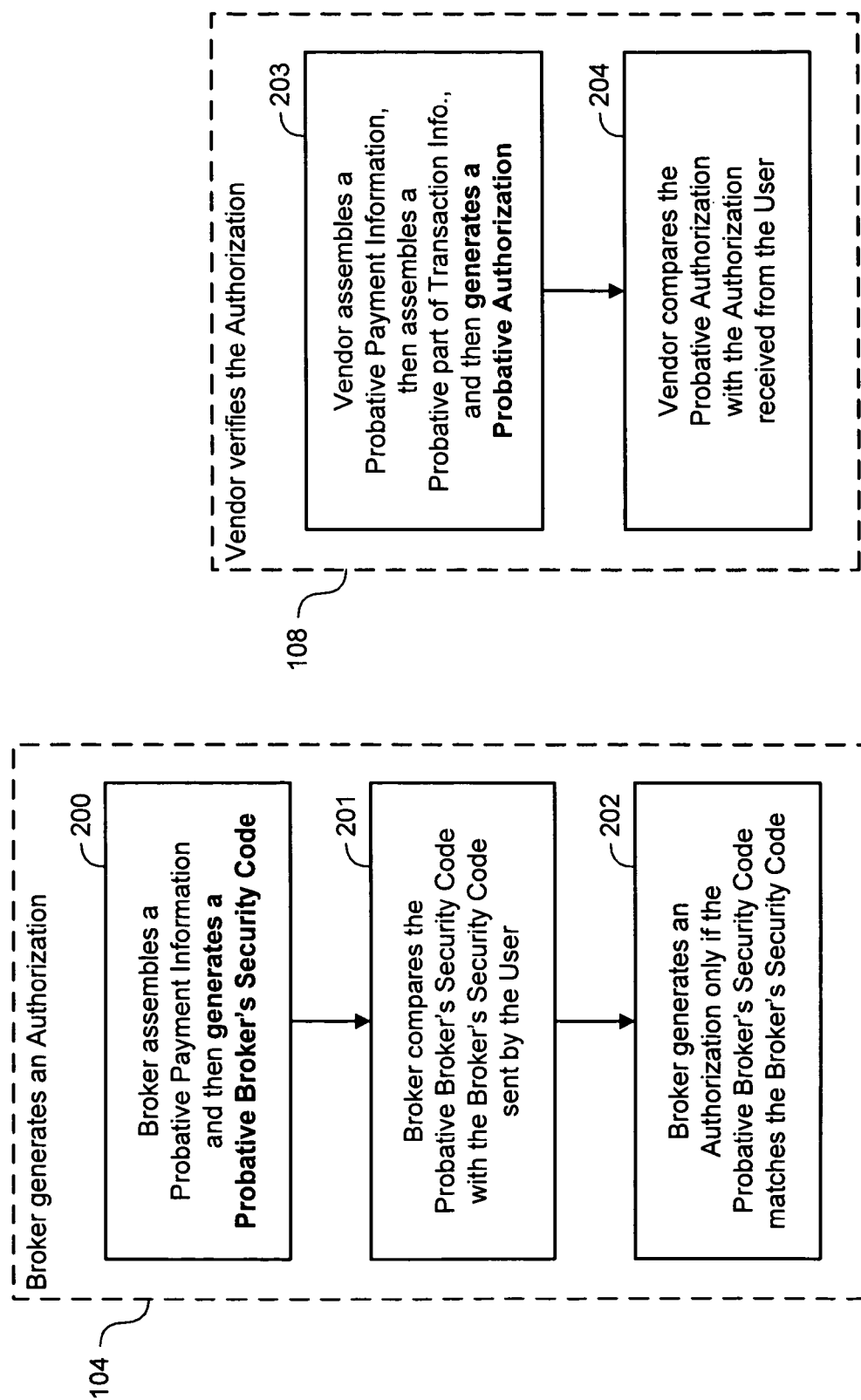
FIG. 2A is a diagram illustrating some aspects of how the Broker can generate an Authorization, in a first embodiment. This figure is related to FIG. 1.
FIG. 2B is a diagram illustrating some aspects of how the Vendor can verify the Authorization, in a first embodiment. This figure is related to FIG. 1.

The Broker then puts together all components of the Payment Information, assembling the so called Probative Payment Information (FIG. 2A, step 200). We use the word "Probative" because the Broker still doesn't know if this is really the correct Payment Information that relates to the Broker's Security Code presented by the User, so that it tries first to assemble this Probative Payment Information as to test it. The Broker does not need to check a Price List to see if the Probative Payment Information is correct. By generating a MAC of the Probative Payment Information with the Broker's secret key, the Broker generates a Probative Broker's Security Code.

If all is correct, the Probative Broker's Security Code will now match the original Broker's Security Code that was first provided for the Payment Information. The Broker compares both to see if they match (step 201).

Note also, that since in this embodiment the Broker is to generate a Probative Broker's Security Code to check the Payment Information, it must: (i) receive all of the necessary Probative Payment Information from the User, meaning that the Transaction Information that the User sent to the Broker (step 103) is constituted of all of the Payment Information; and (ii) the Broker must know the Broker's secret key, which was used to generate the original Broker's Security Code.

The Broker can thus process the Payment Transaction, check the User's ID, debit the User, and credit the Vendor. While processing the Payment Transaction, the Broker generates, in real-time, some extra Transaction Information, for example, the timestamp of the transaction (the date and time when the transaction occurs), the status of the transaction (success or failure), and other information.

The Broker will issue an Authorization (step 202) if its verification of the Broker's Security Code succeeded. This Authorization will be sent to the User in a moment, but it is ultimately directed to the Vendor. If the Vendor completely trusts the Broker, when the Vendor later receives a Broker's Authorization it will know that the Payment Information was already verified by the Broker and that it is correct. The Vendor won't need to check the Broker's Security Code, and the Broker's Authorization needs only to inform the Vendor what Payment Information was processed by the Broker. For this reason, when the Broker generates an Authorization, it doesn't need to include again the Broker's Security Code.

The Authorization generated by the Broker is constituted by some of the extra Transaction Information that the Broker generated, plus the MAC of some other part of the Transaction Information. But what extra Transaction Information should the Broker include on the Authorization? And what some other part of the Transaction Information should the Broker include on the MAC inside the Authorization? It should include whatever the Vendor will later need to check when granting access to the User. In the first embodiment, the extra Transaction Information it must include is only the timestamp of the transaction. The timestamp must be checked later by the Vendor, but the User doesn't have this information before the transaction is carried out, so the Broker must send it embedded in the Authorization. And for the MAC, it may include, implicitly, the price and duration, plus the Vendor's ID, plus the Vendor's ID, plus the timestamp. If necessary, in other embodiments, the Broker can send other information in the Authorization, for example, the IP of the User, a Transaction ID number, or any other suitable information, whatever is to be checked or logged later by the Vendor.

In other words, in the first embodiment, while the Broker's Security Code is the MAC of the Payment Information generated with the Broker's secret key, the Authorization is the MAC of a part of the Transaction Information generated with the Broker's secret key (or other secret key shared by Vendor and Broker), plus some extra Transaction Information that the Broker generated in real-time.

The reason why the Broker should here include a timestamp of the transaction is that usually the Vendor wishes to define a period of time (duration) during which the User may access the content, counting from the moment of payment. So, by including a timestamp in the Authorization, the Vendor can later verify when the payment occurred, and then calculate the elapsed time. In other embodiments, the Vendor can send the duration as part of the minimum Payment Information it sends to the Broker, and the Broker can then calculate itself the expiration time and date of the Authorization, and already include this information in the Authorization. Conversely, if the Authorization is not time-limited, this information needs not to be included at all. Note, once again, that the timestamp goes explicitly (plaintext or similar) in the Authorization, but goes again included implicitly in the MAC, so that it cannot be modified later by the User.

In the first embodiment, the Broker's obligation is to check the Payment Information, guaranteeing that information like the price, is correct, and that it was really generated by the Vendor, and then debit the User and credit the Vendor. It doesn't need to check any Price Lists. As we have already mentioned, if the User changes the price, or changes the URL of the requested content, or fakes any other information, the Broker will know the Payment Information is not correct, and will not generate an Authorization, resulting in the Vendor denying content access to the User.

The Broker then sends the Authorization to the User (step 105). This can be done by a normal server response to the User's request.

As defined in the first embodiment, the payment step, just described, is a relatively separate step from the previous step of pricing, and from the next step of controlling access. The Broker does not need to communicate directly with the Vendor for the payment step to be performed. When the User receives the Authorization from the Broker, this Authorization stands by itself to grant access to the content, either immediately, or later, many times, if permitted by the rules embedded by the Vendor in the Payment Information. To reuse a valid Authorization, the User doesn't need to communicate with the Broker again. As we'll see later, by using cookies the Authorizations are sent from the User to the Vendor whenever the User requests any Vendor's content, and the Vendor will be able to verify if any of the Authorizations grant access to the content to the User. Now let's discuss how things continue in the third and last step: Controlling Access.

First Embodiment

Controlling Access

"Controlling Access" means how the Vendor decides if it should grant or deny the access to some content to the User.

Once the User has received the Authorization generated by the Broker, the User requests the content from the Vendor (step 106), and presents to the Vendor the Authorization plus a part of Payment Information (step 107).

In the first embodiment all the Authorizations the User receives from the Broker, together with their related parts of Payment Information, are stored on the User's web browser cookies related to the Vendor's domain. A cookie is a piece of information sent by a server to a web browser and then sent back from the browser to the server each time it accesses that server, according to certain rules defined by the browser system. But cookies can also be created through JavaScript programs running on the browser. When a cookie is created through JavaScript, it is also sent to the server whenever access occurs. Cookies are ubiquitous on the Internet, and the skilled in the art will have no difficulties dealing with them.

Cookies containing the Authorizations must not be created by the Broker's server; otherwise the Authorizations will later be sent back to the Broker itself, which is not what we want. We want the Authorizations to be sent to the Vendor (this is to say they must be related to the "Vendor's domain"). So the cookies may be set, for example, by some JavaScript running on the Vendor's page that the User accessed as to initiate payment. This way, the cookies will be related to the Vendor's domain, and will be sent to the Vendor whenever a request of content is made by the User to the Vendor.

If we put the Authorizations into cookies, steps 106 and 107 will occur simultaneously, since the request for content itself will send the cookie information automatically. The Vendor will then be able to verify all the Authorizations it received, to determine if the requested content is to be granted access or not. Also, cookies do not interfere with other information on web requests, not even with other cookies that could be set by the Vendor for some other reasons. This means the Vendor will receive the Authorizations whenever normal POST and GET requests occur, e.g., when a User clicks a link in a text, or a button in a form, in a Vendor's web page. And the Vendor will receive all the Authorizations at once, which is important when some requested content relates to more than one element that needs Authorization, for example a web page containing many images bought separately. However, in other embodiments, the Authorizations can be sent to the Vendor by some other means, or only the Authorizations that the User really needs at the moment may be sent to the Vendor. These other embodiments will be discussed later.

Thus, the Vendor should now to verify the Authorization (step 108). In this embodiment, the Vendor first assembles a Probative Payment Information, then assembles a Probative part of Transaction Information, and then generates a Probative Authorization (FIG. 2B, step 203). Then the Vendor compares the Probative Authorization with the Authorization received from the User (step 204). If they match, the Authorization is valid and the Vendor grants access to the content to the User (step 109).

As defined in the first embodiment, this last step of controlling access is a relatively separate step from the previous steps of pricing and of performing payment. The Vendor does not need to consult the Broker when the User requests content, and vice versa. When the Vendor receives the Authorization plus a part of Payment Information from the User, all this information stands by itself, not only to guarantee that the User really performed the payment, but also to define what content should be accessed and in what conditions.

Figure 3:
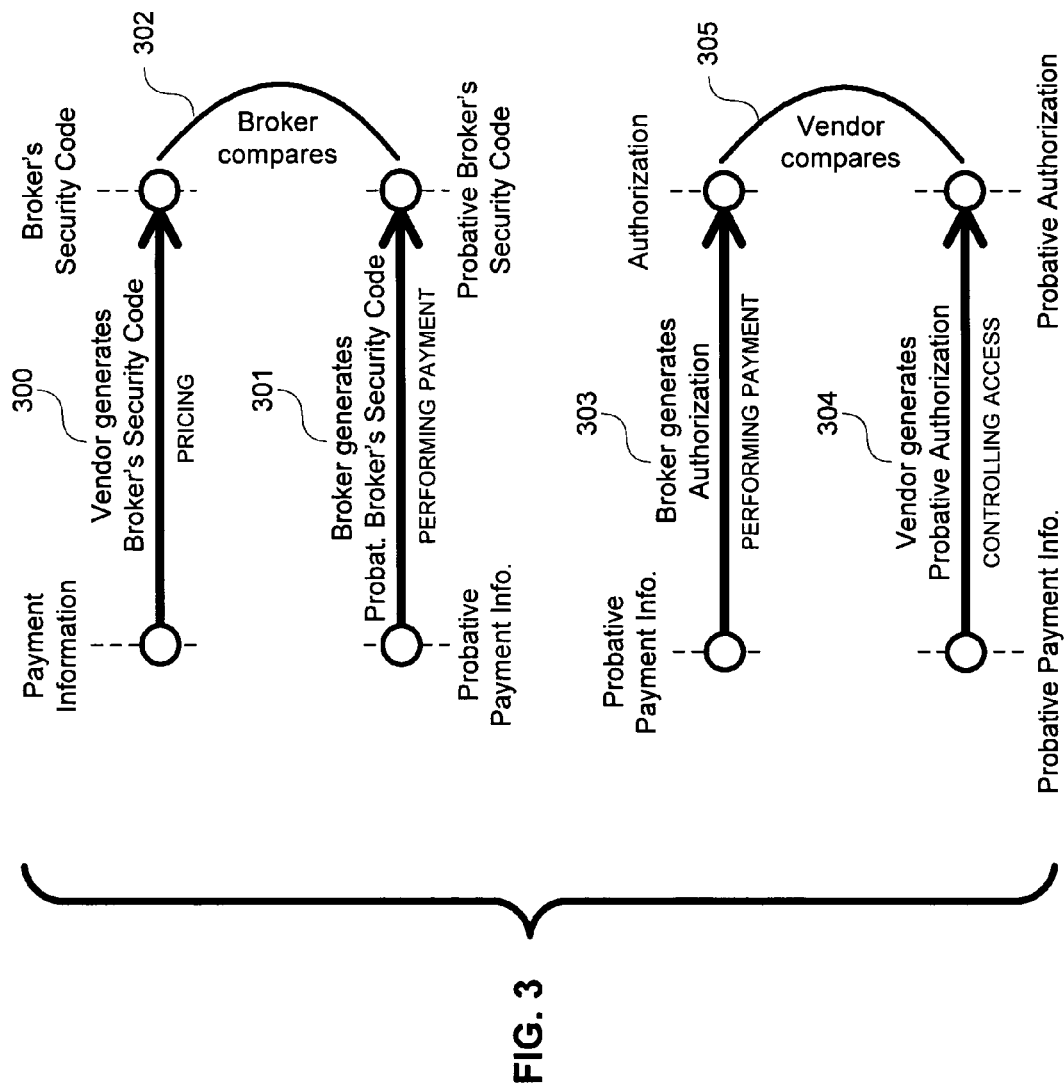
FIG. 3 is a diagram illustrating, in simplified form, some aspects of how, in a first embodiment, the Broker's Security Code and the Authorization work together as to permit the Vendor to control content access. This figure is related to FIG. 1.

The diagram of FIG. 3 disregards detail, and shows again in simplified form, some aspects of how the Broker's Security Code and the Authorization work together as to permit the Vendor to control content access, in this embodiment. The Vendor takes some Payment Information and generates the Broker's Security Code (Pricing, step 300), and the Broker takes some Probative Payment Information and generates a Probative Broker's Security Code (Performing Payment, step 301). By comparing the Broker's Security Code with the Probative Broker's Security Code (step 302) the Broker knows if the Probative Payment Information is correct or not. Only if it is, the Broker generates an Authorization (step 303). As to Control Content Access, the Vendor takes some Probative Payment Information and generates a Probative Authorization (step 304). By comparing the Authorization with the Probative Authorization (step 305), the Vendor knows if it should grant access to the content to the User or not.

As to further clarify and exemplify how to make and use additional embodiments like this, refer to FIG. 4A (Vendor Data Structures), FIG. 4B (User Data Structures), and FIG. 4C (Broker Data Structures). These figures show data structures that can be used in additional embodiments like this.

Each party starts with some initial information (not represented in the figures): the Vendor has the Broker's Secret Key and the Vendor's ID; the User has some User's ID; and the Broker also knows all this initial information, including the Broker's Secret Key. In FIG. 4A, the Vendor assembles Payment Information (structure 400) about the content it wants to sell. This Payment Information is constituted by the URL of the content, plus its price, plus the duration, plus the Vendor's ID. The Vendor generates a Broker's Security Code (structure 401) of the Payment Information. It does this by MACing the Payment Information with the Broker's Secret Key.

In FIG. 4B, the User receives this Payment Information plus the Broker's Security Code (structure 402) from the Vendor. The User separates a part of the Transaction Information, which is called a "First Part of the Transaction Information" (structure 403), and that is constituted by the Broker's Security Code, plus User's ID (for example Login and Password), plus the Payment Information. The User sends this First Part of the Transaction Information to the Broker.

In FIG. 4C, the Broker receives from the User the First Part of the Transaction Information (structure 404), which contains the Payment Information. So, by using this Payment Information and the Broker's Secret Key, the Broker generates a Probative Broker's Security Code (structure 405). Only if the Probative Broker's Security Code matches the Broker's Security Code (which is part of structure 404), the Broker may proceed by processing the Payment Transaction, discounting the User and crediting the Vendor. In the process, the Broker generates some extra Transaction Information, which is called, conveniently, an "Extra Transaction Information" (structure 406), and that includes a timestamp of the transaction. The Broker then separates another different part of the Transaction Information, which is called a "Second Part of the Transaction Information" (structure 407), and that is constituted by the Payment Information (read from structure 404) and the timestamp.

So, since now the Broker knows that the Payment Information is correct, it can proceed by generating an Authorization (structure 408). This Authorization is constituted by the timestamp plus the MAC of the Second Part of the Transaction Information. This MAC is done with the Broker's secret key or with another secret key shared by the Broker and by the Vendor.

Now, back in FIG. 4B, the User receives the Authorization (structure 409) from the Broker. From the Payment Information (structure 402), the User separates a part of it, which is called a "First Part of the Payment Information" (structure 410), and that is constituted by the price plus the duration. This First Part of the Payment Information will later be necessary for the Vendor to check the Authorization. The Http Request of Content (structure 411) contains the URL of the content, plus the Authorization, and plus the First Part of the Payment Information.

Back in FIG. 4A, the Vendor receives the Http Request of Content (structure 412) from the User, and assembles a Probative Payment Information (structure 413), which is constituted by the URL of the content, plus the price, plus the duration, and plus the Vendor's ID. By adding the timestamp (that the Vendor reads from the Authorization, inside structure 412), it assembles a Probative Second Part of the Transaction Information (structure 414). Finally, it calculates a Probative Authorization (structure 415), which is constituted by the timestamp plus the MAC of the Probative Second Part of the Transaction Information, calculated with the Broker's secret key.

The Vendor now compares the Probative Authorization it just generated with the Authorization generated by the Broker, which was sent by the User to the Vendor with the Http Request of content. If the Authorizations match, it is because the Authorization is valid, and the Vendor may grant access to the content to the User.

Even though the data structures in FIGS. 4A, 4B and 4C are presented in a specific way, this is done just to detail and facilitate understanding on how to use and make the embodiments. The skilled in the art are able to devise other different data structures or different logical relationships between data structures, without departing from the spirit and scope of the method.

Performance, Privacy, Trust, Accountability and Liability Issues

The first embodiment, as explained above, still presents at least four major disadvantages. These disadvantages will be completely solved with the new features of the preferred embodiment, that will be presented later.

A first disadvantage of the first embodiment is that the Broker must verify the Payment Information for all Vendors. It would be better if each Vendor could verify its own Payment Information, because while the Vendor must deal only with its own sales, the Broker must deal with the sales of all the Vendors, maybe hundreds of thousands of them. It is therefore better to be light on the Broker than on the Vendor, specially for micropayment applications.

A second disadvantage of the first embodiment is that, since the Broker has to receive all the Payment Information as to check if it is correct, the Broker gets to know what the User is paying for. This hurts user privacy, which is a desirable characteristic of internet payments methods.

A third disadvantage of the first embodiment is that, since the Broker has the responsibility to verify if the Payment Information is correct, how does the Vendor know if the Payment Information was not modified by the Broker itself? The Vendor could, of course, check a Price List, but this would destroy the performance gains and the whole purpose of using a Broker's Security Code in the first place.

Of course, the Vendor could simply decide to trust the Broker. But even if the Broker is considered a trusted party (i.e., the Vendor trusts that the Broker will pay him in the end of the month), in practice the system should be accountable: there should be ways for the Vendor to verify that the prices were charged as determined. In practice, few Vendors would agree to use a system which is not accountable, where they must trust the Broker completely and where it is impossible to detect problems.

To further stress this point, in systems where the Broker verifies the Payment Information, both the Broker and the Vendor must share the Broker's secret key (in case of using high performance symmetric keys). In this case the Broker can, in principle, fraud the Vendor by generating fake Broker's Security Codes, charging a higher price than the Vendor determined, but still informing the Vendor of a lower value and keeping the difference.

A fourth disadvantage of the first embodiment is that, if the Vendor's Secret Key is compromised by a hacker at the Broker (if the Broker system is invaded, for example), the hacker could also generate Broker's Security Codes. This leads to Broker liability. In fact, this would be such a serious breach that if a hacker managed to steal all Broker's secret keys from the Broker (i.e., the whole Key database) this could easily lead to Broker bankruptcy, since the whole system would fail at once.

Note that, in the prior art, since a Price List is checked by the Vendor, most systems are accountable, which means that the Vendor would detect if the Broker modifies the Payment Information. Also, in the prior art, since Vendors may send only a reference number to Brokers instead of all of the Payment Information, most systems can solve privacy issues (i.e., so that the Broker doesn't know what the User is paying for). As a result, the first embodiment, even if more efficient than prior art in terms of costs, would made Vendor skeptical in terms of trust and accountability, would make Users wary of privacy issues, and would make the Broker liable under certain circumstances.

Preferred Embodiment

The preferred embodiment will solve all the disadvantages presented by the first embodiment. Now, instead of using a Broker's secret key, the Vendor will use instead a Vendor's Secret Key, i.e., a secret key that may be generated and used by the Vendor alone, and that may be kept secret from everyone else, including the Broker and the User. The Vendor will use the Vendor's Secret Key to MAC the Payment Information and generate a Vendor's Security Code instead of a Broker's Security Code. The Vendor's Security Code will protect both the Payment Information's integrity as well as its authenticity by allowing the Vendor to detect any changes to the Payment Information and to confirm that the Payment Information and the Vendor's Security Code were indeed created by the Vendor.

Now, since the Broker doesn't know the Vendor's Secret Key, the Broker cannot create a Vendor's Security Code and cannot verify the Vendor's Security Code and the Payment Information. As a result, the Vendor does not need to trust that much the Broker. If the Broker modifies the Payment Information, the Authorization will not be accepted later by the Vendor. The Vendor will know that the prices are charged as the Vendor determined, and the system is accountable. Also, there is no Broker liability, since the Broker does not need to have Vendors' secret keys.

Since the Broker doesn't know the Vendor's Secret Key, it will not (and cannot) verify the Payment Information. Each Vendor will verify its own Payment Information, and the process becomes lighter on the Broker. As discussed this is better than in the first embodiment, because while the Vendor must deal only with its own sales, the Broker must verify payments for all the Vendors.

Also, since the Broker will not and cannot verify the Payment Information, there is no reason for the Broker to receive all of the Payment Information in the preferred embodiment. This solves the privacy issues of the first embodiment.

To accomplish all this, we need to change steps 101, 103, 104 and 108. These changes are represented in FIGS. 5 and 6.

Preferred Embodiment

Details

As discussed, in this preferred embodiment the Vendor will use a Vendor's Secret Key, which may be known only by the Vendor, to generate a Vendor's Security Code (FIG. 5, step 500). The reason why the Vendor can use a Vendor's secret key comes from an interesting characteristic of MACs: if only a single person knows a secret key, this person alone can later verify if the message was really generated by himself or herself, and if the message has not been modified by others, since then. This is called self-authentication. It was not used in the first embodiment, but it is very useful to this preferred embodiment, as we will see.

In this preferred embodiment, the part of the Transaction Information that the User sends to the Broker doesn't need to contain all of the Payment Information received from the Vendor, but only a minimum part of it (FIG. 5, step 501). This is because the Vendor's Security Code itself contains, implicitly, a way for the Vendor (and not the Broker) to later verify the integrity of all the Payment Information. In fact, the Broker doesn't need necessarily to know explicitly almost any information about the content bought by the User, which assures privacy to the latter.

For example, we do not need necessarily to include, in this minimum part of the Payment Information, the URL or another explicit way of identifying the content being bought. This is important not only to solve privacy issues, but also because URLs are generally big strings, and if we don't need to send this information we economize bandwidth. Apart from the URL, many other component parts of the Payment Information also don't need to be sent to the Broker. In fact, in the preferred embodiment, to reduce the amount of information sent over the network, the part of the Transaction Information that the User sends to the Broker may contain only the Vendor's Security Code, plus the User's ID, plus the price the User will pay, plus the Vendor's ID. This may amount to less than 100 bytes of information! A very low amount of data by today's standards.

Now, when the Broker generates an Authorization (step 502), the Broker does not and cannot verify the Payment Information (this is very different from step 104). The Authorization generated by the Broker includes some of the extra Transaction Information that the Broker generated, plus the MAC of some information including some of the extra Transaction Information plus the Vendor's Security Code, plus the price, plus the Vendor's ID, generated using the "Authorization's secret key". This Authorization's secret key is a key previously agreed between the Vendor and the Broker. This secret key must be Vendor specific, i.e., the Broker should use a different secret key for each Vendor, when creating Authorizations. If this key were used by more than one Vendor, or becomes otherwise disclosed to other people, then these other people could create fake Authorizations to the Vendor. But, in case this key is ever compromised, it is much easier to replace than the Broker's secret key of the first embodiment, since it was not used to create the Vendor's Security Codes.

The Broker will still accept the payment and debit the User. In this preferred embodiment, the Broker's obligation is, apart from debiting the User and crediting the Vendor, only to MAC a few bytes of information. And most of these few bytes of information are constituted by the Vendor's Security Code, which the Broker doesn't even know what it contains nor does it need to know. The Broker doesn't need to check if any Payment Information, like the price, is correct, nor if this Payment Information was really generated by the Vendor. It doesn't need to check any Price Lists.

As we have already mentioned, if the User changes the price, or changes the URL of the requested content, or fakes any other information, the Broker may still accept the payment, debit the User, and generate an Authorization. But the Vendor will not later accept the Authorization generated by the Broker, since the Payment Information will not be compatible with the Vendor's Security Code that only the Vendor can generate, and thus won't pass verification by the Vendor, resulting in the Vendor denying content access to the User. In other words, the Broker doesn't need to guarantee that the Vendor will later accept the Authorization as valid and, as we have seen, this is why it was possible for us to send less Transaction Information than would be required for the Broker to guarantee this.

When the Vendor receives the User's request for the content, it must verify if the price the User paid (and all other payment conditions) is correct, i.e., if the price the User paid is really the one the Vendor determined for the content, to start with. In the prior-art, as discussed, this verification is done by simply checking a Price List, as asking "does the price that the User paid for this content is the same as shown in my Price List?". In the preferred embodiment, the Vendor provided this Payment Information to the User in the beginning (in the Pricing step, before the Payment Transaction initiated), but now we are in a different moment in time, in a stateless web environment. Checking a Price List containing all of the Payment Information would solve the problem, but would create some overhead, raising the transaction costs. This overhead will be discussed in more detail later in this text. So, to avoid this overhead, the Vendor here does not check the paid price against a Price List, i.e., the Vendor does not access the original Payment Information it created itself. We'll show how it can authenticate the Payment Information by simply verifying the Authorization.

When the Vendor receives the User's request for the content, together with the Authorization and a part of Payment Information, the Vendor verifies the Authorization (step 503). If the Authorization is valid, the Vendor may grant access to the content to the User.

Now, the following text explains a way for the Vendor to verify the Authorization. For simplicity, we'll consider it is verifying a single Authorization, but in the embodiments where the Vendor receives more than one Authorization it can simply verify each one of them, and grant access to the User if at least one of them is valid for the content.

Preferred Embodiment

Controlling Access—More Details

In FIG. 6 we can see some internal details of step 503, where the Vendor verifies the Authorization. We should remember that here the Vendor does not need necessarily to maintain a Price List of the content, as to verify the Authorization. I.e., the Authorization (together with a part of Payment Information sent by the User) can stand by itself to grant access to the content to the User. In the first embodiment, the part of Payment Information that the Vendor must receive from the User consists of all the information that the Vendor must have to reconstruct the original Vendor's Security Code of the Payment Information. The original Vendor's Security Code was a MAC of all components of the Payment Information, which included, for example: the URL of the requested content, plus the Vendor's ID, plus the price and duration. But the URL can now be read from the Http Request itself, and the Vendor's ID is already known by the Vendor, supposing the Vendor and the Broker agreed on it when the Vendor registered with the Broker. So the part of Payment Information that the Vendor must now receive from the User is only the price and the duration.

In step 600, by putting together all components of the Payment Information, the Vendor first assembles a so called Probative Payment Information. We use the word "Probative" because the Vendor still doesn't know if this is really the correct Payment Information that relates to the Authorization presented by the User, so that it tries first to assemble this Probative Payment Information as to test it. Remember that the Vendor does not want to check a Price List to see if the Probative Payment Information is correct. By generating a MAC of the Probative Payment Information with the Vendor's secret key, the Vendor generates a Probative Vendor's Security Code. If all is correct, the Probative Vendor's Security Code will now match the original Vendor's Security Code the Vendor first provided for the Payment Information. But the Vendor still doesn't know if they indeed match.

In step 601, by putting together this Probative Vendor's Security Code, plus a part of the Probative Payment Information (the price and Vendor's ID), plus a part of the extra Transaction Information (the timestamp) read from the Authorization, the Vendor first assembles a Probative part of the Transaction Information. By generating a MAC of the Probative part of the Transaction Information, with the Authorization's secret key, the Vendor generates a Probative Authorization. Remember that, regarding step 502, the Broker uses a cryptographic MAC algorithm with a secret key to generate the Authorization. For the Vendor to be able to generate a Probative Authorization, it must also know the secret key used by the Broker, which means that the Vendor and the Broker should have already agreed upon what secret key to use between them for this communication. This is the "Authorization's secret key".

Then, in step 602, the Vendor compares the Probative Authorization it just generated with the Authorization generated by the Broker, which was sent by the User to the Vendor with the content request. If the Authorizations match, then the Authorization is valid. And there was no necessity to check any Price List containing the Payment Information.

In this embodiment, the Vendor does not need to directly compare the Probative Vendor's Security Code with the original Vendor's Security Code. This is because the Authorization implicitly contains the Vendor's Security Code (it contains a MAC of it), and thus the Probative Authorization will not match the Authorization unless the Probative Vendor's Security Code also matched the original Vendor's Security Code anyway. And, as we have seen, the Probative Security Code will not match the original Security Code unless the Payment Information was not modified by the User, by the Broker, or by anyone else.

There is no need for the Vendor to perform any database queries on a Price List since all the information needed for the Vendor to generate both the Probative Vendor's Security Code and then the Probative Authorization is sent real-time from the User to the Vendor, except, of course, for the secret keys. But the secret keys can be kept in fast-access memory, or in simple and small files. Even though the Payment Information must be present in the beginning of the payment process, so that the User can view prices and start payment, this information can be put directly in the web pages that the User accesses, and not in a separate Price List. And even if the Vendor decides to maintain a Price List so as to write this information to the User before payment initiates, there would be no real need to check this Price List again when verifying if the Authorization is valid.

Obviously, in this and in all embodiments, the Vendor (or the Broker, depending on the embodiment) should also check if all conditions of the Transaction Information are coherent with the content that is being requested by the User. For example, if the timestamp tells us that the payment transaction was held at 2:00 PM, and if the "duration" is 5 minutes, than the access to the content should not be granted to the User if the clock now shows 2:06 PM. Or, for another example, the identification of the content (the content is usually identified by its URL) being requested should also match the identification that is authorized or confirmed. All other kinds of conditions or restrictions that apply should also be checked. For simplicity, we will not refer again to this necessary check from now on, but it should be clear that, in all embodiments, this check must be made when content is requested, and that, only if this check passes, an Authorization should be considered valid or confirmed, or a Confirmation should be considered to confirm some operation, or some content should be considered authorized or confirmed. Conversely, if this check does not pass, access to the content should not be granted.

The diagram of FIG. 7 disregards detail and shows again, in simplified form, some aspects of how the Vendor's Security Code and the Authorization work together as to permit the Vendor to control content access. The Vendor takes some Payment Information and generates the Vendor's Security Code (Pricing, step 700), and the Broker takes the Vendor's Security Code and generates the Authorization (Performing Payment, step 701). As to Control Content Access, the Vendor takes some Probative Payment Information, generates a Probative Vendor's Security Code (step 702) and then generates a Probative Authorization (step 703). By comparing the Authorization with the Probative Authorization (step 704) the Vendor knows if it should grant access to the content to the User or not.

In the preferred embodiment, as described above, the new features present new and unexpected results: improving performance, and solving privacy, trust, accountability and liability issues in relation both to the prior art and to the first embodiment.

Preferred Embodiment

Data Structures

From the explanation above, one skilled in the art will be able to determine the data structures that may be used to implement this and similar embodiments. Even so, as to further clarify and exemplify how to make and use them, FIG. 8A (Vendor Data Structures), FIG. 8B (User Data Structures), and FIG. 8C (Broker Data Structures) show some data structures that can be used. Above each rectangle the manner in which the data is obtained is detailed, e.g., "Vendor generates", or "Broker receives from the User". The name of the data structures are shown in bold type in the top part of each rectangle, while the components of each data structure are shown in the bottom part, represented as topics preceded with black dots. Sub-components of some components are also sometimes shown, preceded with arrows. Some data structures can be components of other data structures.

These figures are also used to suggest the number of bytes of some important structures, making clear how Payment Transactions can be carried out with a very low amount of data processing and communications.

Each party starts with some initial information (not represented in the figures): the Vendor knows the Vendor's Secret Key, the Authorization's secret key and the Vendor's ID; the User has some User's ID; and the Broker also knows all this initial information, except, of course, for the Vendor's Secret Key, which is known only by the Vendor in this embodiment. In FIG. 8A, the Vendor assembles Payment Information (structure 800) about the content it wants to sell. This Payment Information is constituted by the URL of the content (i.e., the identification of the content), plus its price, plus the duration (optional), and plus the Vendor's ID. The Vendor generates a Vendor's Security Code (structure 801) of the Payment Information. It does this by MACing the Payment Information with the Vendor's Secret Key.

In FIG. 8B, the User receives this Payment Information plus the Vendor's Security Code from the Vendor (structure 802), and then separates from it some part of Payment Information that is constituted only by the price plus the Vendor's ID. This is just the minimum part of the Payment Information that the Broker will later need. Since this is a first part that we separate from the whole Payment Information, we call this a "First Part of the Payment Information" (structure 803).

When the Payment Transaction is initiated, the User assembles a part of the Transaction Information, which is called a "First Part of the Transaction Information" (structure 804), and that is constituted by the Vendor's Security Code, plus User's ID (for example Login and Password), plus the First Part of the Payment Information (price and Vendor's ID). Then, the User sends this information to the Broker.

So, in FIG. 8C, the Broker receives this First Part of the Transaction Information (structure 805). Let's calculate how many bytes of information were received: supposing the Vendor's Security Code with 27 ASCII characters (160 bits of information with a HMAC-SHA1 algorithm, represented in base 64), the price with 7 ASCII characters (for example "0.10USD" for 0.10 dollars), the Vendor's ID with 7 numbers, the User's Login with 10 ASCII characters, and a User's Password with 10 ASCII characters. Then the First Part of the Transaction Information is just 61 ASCII characters long. This is a very low amount of information to be transmitted from the User to the Broker as to initiate the Payment Transaction.

After the Broker receives this First Part of the Transaction Information, it processes the Payment Transaction. The Broker may discount the User and credit the Vendor, and generate some extra Transaction Information which is called, conveniently, an "Extra Transaction Information" (structure 806). In special, the Broker generates a timestamp of the transaction. This timestamp may be in any format capable of representing time, but a popular format that can be represented in 10 number digits is the number of seconds elapsed since 1 Jan. 1970. The Broker then assembles another different part of the Transaction Information, which is called a "Second Part of the Transaction Information" (structure 807), and that is constituted by the Vendor's Security Code, plus the price, plus the Vendor's ID, and plus the timestamp.

Finally, the Broker generates an Authorization (structure 808), related to the Transaction Information. This Authorization is constituted by the timestamp plus the MAC of the Second Part of the Transaction Information. This MAC is done with the Broker's secret key to the Vendor. There are at least three reasons why the Authorization may be constituted like this. First, the timestamp of the Authorization must be included inside the Authorization in plaintext (or other readable form) and also embedded in the MAC of the Authorization (not in readable form, we mean, but just as part of the message that is used to generate the MAC). This is because the Vendor will later have to know and authenticate this timestamp that is created real-time by the Broker. Second, the MAC must also embed the Vendor's Security Code. This is because if the Authorization fixed only the price and the Vendor's ID, and not the Vendor's Security Code, then the User could use the Authorization with some other Payment Information from the same Vendor that had the same price. In other words, by including the Vendor's Security Code in the Authorization's MAC, we guarantee that the User cannot modify any other Payment Information that is not explicitly sent to the Broker. And third, the Broker must embed the price and the Vendor's ID in the Authorization's MAC because, at least in the first embodiment, the Broker does not verify the Vendor's Security Code, and cannot tell if the price and the Vendor's ID that it is using are correct to begin with. In other words, although the price and the Vendor's ID of the original Payment Information are embedded in the Vendor's Security Code, the Broker must separately embed, in the Authorization's MAC, the price and Vendor's ID that the Broker is really using, so that, later, the Vendor will be able to tell if the price and Vendor's ID of the Payment Information are equal to the ones that the Broker really used.

If the Authorization's MAC is also generated with a HMAC-SHA1 algorithm, we have 27 ASCII characters. If we use 10 ASCII characters for the timestamp, then the Authorization is just 37 ASCII characters long. This is a very low amount of information to be transmitted from the Broker to the User as to conclude the Broker's role on the Payment Transaction.

Now, back in FIG. 8B, the User receives the Authorization (structure 809) from the Broker. From the Payment Information (structure 802), the User separates another different part of the Payment Information, which is called a "Second Part of the Payment Information" (structure 810), and that is constituted by the price plus the duration. This Second Part of the Payment Information will later be necessary for the Vendor to check the Authorization. As previously discussed, in the first embodiment, the User puts the Authorization and the Second Part of the Payment Information into the browser cookies, so that this information is automatically sent to the Vendor when the User requests the content. So, the Http Request of Content (structure 811) contains the URL of the content, plus the Authorization, and plus the related Second Part of the Payment Information, apart, of course, of lots of other eventual information that are not related to the payment transaction itself, e.g., the Http Headers and other cookies.

The URL and this other eventual information will be sent anyway, as regular information pertaining to the Http Request, even if there were no payment occurring. Thus, if counting only the payment overhead, the Authorization is 37 ASCII characters, the price is 7 ASCII characters, and the duration is 7 ASCII characters (for example, the number of minutes, up to a maximum of 10 years). Then the payment overhead of the Http Request is just 51 ASCII characters long. This is a very low amount of information to be transmitted from the User to the Vendor, so that the User is able to access the paid content.

So, back in FIG. 8A, the Vendor receives the Http Request of Content (structure 812) from the User, and assembles a Probative Payment Information (structure 813) which is constituted by the URL of the content, plus its price, plus the duration, and plus the Vendor's ID. The Vendor generates a MAC of this Probative Payment Information, using its Vendor's Secret Key, as to obtain a Probative Vendor's Security Code (structure 814). Then, it assembles a Probative Second Part of the Transaction Information (structure 815), that is constituted by the Probative Vendor's Security Code, plus the price, plus the Vendor's ID, and plus the timestamp. Finally, the Vendor calculates a Probative Authorization (structure 816) which is constituted by the timestamp plus the MAC of the Probative Second Part of the Transaction Information, calculated with the Broker's secret key to the Vendor. Remember that the Broker's secret key to the Vendor is known both by the Broker and by the Vendor.

The Vendor now compares the Probative Authorization it just generated with the Authorization generated by the Broker, which was sent by the User to the Vendor with the Http Request of content (inside structure 812). If the Authorizations match, this means that the Authorization is valid, so the Vendor may grant access to the content to the User.

Regarding the previous calculations about the amount of information to be transmitted between parties, it is even possible to further reduce the number of bytes to be transmitted, e.g., by representing some of the information (like the duration or the Vendor's ID) in base 64, or by using some technology capable of transmitting compressed or binary information.

All these calculations show that the new features of the preferred embodiment present the new and unexpected result of an extremely low transaction cost, far less than in prior art systems and even lower than in the first embodiment.

Even though the data structures in FIG. 8A, FIG. 8B and FIG. 8C are presented in a specific way, this is done just to detail and facilitate understanding on how to use and make the embodiments. Those skilled in the art are able to devise other different data structures or different logical relationships between data structures without departing from the spirit and scope of the method.

RAMIFICATIONS

It is further possible to modify the information flow. For example, after the Broker generates an Authorization, this Authorization can be sent directly from the Broker to the Vendor. In FIG. 1, step 105 can be altered to read "Broker sends the Authorization to the Vendor". Since the Authorization is not received and stored by the User, then it must be stored by the Vendor (or else stored by the Broker, just to be sent again to the Vendor whenever necessary). Of course, in embodiments where the Authorization is meant to be used only once and immediately after it is received by the Vendor, then it doesn't need to be stored at all. With this modification, when the User requests content from the Vendor, the User doesn't need to send the Authorization to the Vendor anymore. The User may simply request the content from the Vendor, and then the Vendor will use the Authorization it received directly from the Broker. Thus, step 107 can be simplified to read "User sends a part of Payment Information to the Vendor".

It is further possible to modify the information flow so that the part of Transaction Information that the User sends to the Broker (step 501) contains more of the Payment Information (instead of just minimum information), then the Broker can also send this information directly to the Vendor. I.e., step 105 can be altered to read "Broker sends the Authorization plus a part of the Payment Information to the Vendor", and then step 107 be completely eliminated.

Other important additional embodiments are created by substituting a Digital Signature for the MAC, when generating the Broker's Security Code, the Vendor's Security Code, or the Authorization. Whenever the Broker or the Vendor needs to authenticate information from one another, the Digital Signatures and asymmetric keys can be used so that there is no need to provide a different secret key for each Broker-Vendor pair. For example, to create the Authorization in the first embodiment, the Broker must keep a different secret key for each different Vendor. But if using Digital Signatures, the Broker may simply digitally sign the Authorization with its single private key, and then all Vendors may use the same single Broker's public key to verify it. This is so, since knowledge of the Broker's public key doesn't permit one Vendor to fake the Broker's Authorizations to another Vendor. In this case, the information that is digitally signed will probably include a Vendor's ID, so that each Vendor can be sure that some Digital Signature of the Broker is really directed to it, and not to some other Vendor. In other words, a single asymmetric key pair that allows a party to perform Digital Signatures has the advantage of dispensing with the necessity of having many secret keys to perform MACs to each other party. Unfortunately, Digital Signatures are generally much more slowly to compute (need more computational power) and generate much longer results (in bytes) than MACs. For this reason, embodiments using only the lighter and faster MACs are presently preferred. The expressions "MAC" and "Digital Signatures" are here used to express, respectively, symmetric and asymmetric key algorithms for authenticating information. Should any other names or expressions be used, or similar technologies to accomplish the same authentications result, this does not depart from the spirit and scope of the method.

In this discussion, although steps were cited in a certain order, most steps can be executed in different orders. For example, the step of requesting content (step 106) and the step where the User sends the Authorization to the Vendor (step 107) can occur in any order, or even simultaneously. Also the Vendor can provide a Vendor's Security Code of Payment Information (step 500) only after the Payment Transaction is initiated (step 102). Step 100 can also occur after step 102, in systems where the User doesn't know in advance what the Payment Information is, and possibly can abort payment later when it is finally informed, or in systems where Payment Information is included twice, one time in the web page just for viewing purposes, and another time for the real payment. However, for example, step 108 cannot occur before step 107, because the Vendor cannot verify the Authorization before it receives it, i.e., step 108 is dependent upon the execution of step 107. The skilled in the art are able to determine which steps depend on one another, as to generate alternative embodiments.

Usually, the Payment Transaction is initiated by the User. However, it can also be initiated by some other entity. For example, when the time is over for some web site subscription the User has made, a Payment Transaction may be automatically initiated by the Vendor or by the Broker, as to renovate the subscription.

In this discussion, paid-links were regarded as an easy way for the Vendor to make available the Payment Information and Vendor's Security Code to the User, by including paid-links on web pages that the User may access. However, this information can be included in any other viable way, for example, by giving an "id" attribute to the HTML element or other way of identifying an HTML element, and later associating the information with it, through JavaScript; or by directly executing JavaScript functions or plugins or ActiveX functions; or by generating Payment Information and Vendor's Security Code at real-time, when the User clicks a link or a button. In fact, if desired, this information can even be read from a Price List located on a Vendor's server or on a Broker's server.

In this discussion, some information flows were presented that carry out the Payment Transaction according to some embodiments. However, more communications can be included between parties, or between parties and other entities, or some communication orders can be altered. Any such modifications in the information flow do not depart from the spirit and scope of the method. For example, there can be additional communications between Vendor and Broker to confirm data and guarantee that there were no communication errors; or there can be additional communications between Broker and User to inform credit details, or between Broker and Vendor to inform the sales total; or there can be extra communications between the Broker and a bank, as to check exchange rates if the price to be paid by the User is in a different currency than the Vendor's currency; or there can be any other extra communications to exchange any other information that is necessary for some specific functionality of the payment system.

In some embodiments, all or part of the information flow can be performed by insecure (for example Http) or secure connections (for example Https). Or the information itself, or part of it, may be encrypted by any suitable technique. Modifications can also be applied to achieve some "security by obscurity", for example by transforming any information in a way that is cosmetic or reversible or predictable or repeatable. For example, if the User applies a cryptographic hash function to the Vendor's Security Code, or writes it backwards, and then sends it to the Broker, it can still perform the Vendor's Security Code goals. Therefore, when talking about the Vendor's Security Code, in the description or in the claims, the reader should consider that any such transformation variations are included in the term "Vendor's Security Code". This also applies to any other information exchanged by the parts, like the Authorization, or the Confirmation, or the Payment Information, or the Transaction Information.

Even though in some embodiments only minimum Payment Information needs to be sent from the User to the Broker, the only real requirement is that enough information is sent as to allow the complete operation. It is not difficult, for one skilled in the art, to determine the minimum information he or she needs (or wants) to send, once the requirements and functions of the payment system are defined. For example, in some embodiments, more information can be sent, to also include the URL (Uniform Resource Locator) or the duration, to allow a more detailed log (registry) of the transactions on the Broker. Or more than one Vendor's ID can be send, when there is more than one Vendor to be credited (shared profits). Also, in other embodiments, less information can be sent, for example, if all price items are fixed and known in advance, there is no need to send the price for each piece of content. Or if the Broker identifies the Vendor in some other way, for example, through the Http Referrer (see en.wikipedia.org/wiki/Referrer), or if the Broker is serving only a single Vendor (or if the Broker and the Vendor are indeed the same entity), then there is no need to send the Vendor's ID to the Broker.

Even though in some embodiments the Authorizations are sent from the User to the Vendor through cookies, in other embodiments the Authorizations can be sent through a GET request, appended at the end of the URL (for example, just like disclosed in Nelson's patent), or through XMLHttp Requests (Ajax) or through plugins, ActiveX, iframes, or any other methods. The cookie technique is easier and more generic when one wants to send to the Vendor all of the Authorizations the User currently has, and leave it to the Vendor the task of determining which one to use, if any. But, in other embodiments, the User doesn't need to send all of the Authorizations he or she may possess, but rather to present only the single Authorization that permits access to the specific content the User is currently requesting. In these embodiments, it may be easier to use one of the other methods of sending the Authorizations. Also, in other embodiments, the User may present each Authorization to the Vendor only once, and then the Vendor may store the Authorization for subsequent use, during the Authorization's validity.

Even though in some embodiments the identification of the content is the content's URL, in other embodiments the content may be identified by a code, such as a name or a number, providing the Vendor has some means of determining what content corresponds to it. This may be done by lists or tables, linking codes to content. But it is not necessary to use lists or tables. For example, the code may be a number in a predefined directory of ordered items, or the file name in a predefined directory of images, or a unique name attributed to some resource, like the name of a MP3 music, or the like. Or, in the embodiments where the Broker itself doesn't need to process this type of information, it is also possible to take a generic approach and let each Vendor define its own way of corresponding codes to content.

Even though in some embodiments the Vendor provides Payment Information and related Vendor's Security Code to the User, these can be provided by the Broker, or by some other entity, on behalf of the Vendor.

Even though in some embodiments payment is performed fully online, payment can also be performed off-line or partly off-line (hybrid), for example, by the User or the Vendor assuming some risk by not communicating with the Broker when the price to be paid by the User is too low for a single transaction, or by combining present embodiments with other probabilistic techniques, or with digital cash, electronic tokens or other electronic representation of money.

Even though in some embodiments content can be sold and bought through micropayments, in other embodiments physical products can be sold and bought, or the payments may be in fact macro payments (normal valued payments).

CONCLUSION

The various embodiments allow the construction of very efficient payment systems. To acknowledge this, it follows a simple efficiency analysis, discussing the communication overhead, the cryptographic overhead, and the database (disk access) overhead of the first embodiment. Other embodiments elicit similar considerations. The term "overhead" here refers to the extra computation effort, bandwidth, or other resources that are required to access paid content (i.e., when performing a payment), in comparison with accessing free content (i.e., when not performing a payment).

For the communication overhead, as discussed before, the number of bytes of information to be sent from one part to another, as to perform payment, is very low. Apart from normal Http (or Https) overhead, in the first embodiment only 61 bytes need be sent from the User to the Broker; 37 bytes from the Broker to the User; and 51 bytes from the User to the Vendor. In another aspect, when counting the number of independent communications demanded, even if considering that a request/response communication counts, in fact, as two separate communications, then there are only three communications to be performed. And one of them, the Http Request of Content from the User to the Vendor, must be performed anyway whenever the User requests paid or free content, so that only the communications between the User and the Broker may be considered as an overhead. Besides, if the User pays for accessing some content over some period of time, then even if the User accesses this content hundreds of times during the period, there is no need for the User to communicate again with the Broker as to generate another Authorization. This is so because the original Authorization is still valid and can be directly presented by the User to the Vendor whenever necessary. The conclusion is that the communication overhead is very low.

The cryptographic overhead is also low. There are only two cryptographic calculations to be performed. One is made by the Vendor, when it creates the Vendor's Security Code for some Payment Information. If some Payment Information is static for some period of time, which is usually the case, the Vendor's Security Code can be pre-computed, so that the same Payment Information and the same Vendor's Security Code can be used over and over thousands of times by many different Users. The situation is different in the Broker's side, since the Broker must compute a MAC for each transaction. However, it is a single MAC, and (most) MACs are very fast to perform. Besides, if the User pays for accessing some content over some period of time, then even if the User accesses this content hundreds of times during the period, there is no need for the Broker to compute additional MACs. This is so because the original Authorization is still valid and can be directly presented by the User to the Vendor whenever necessary. And the User doesn't need to calculate any cryptographic information. The conclusion is that the cryptographic overhead is also very low.

The database (disk access) overhead is also low. The Broker doesn't need to check any Price List since the Broker doesn't need to verify the validity of the Payment Information. This is less database access to make. As to further stress this point about Price Lists, regarding both the communication overhead and the database overhead, from real world examples like BitPass, it can be seen that these systems must furnish the Vendors with complex and user-friendly interfaces. This interface must let the Vendor log into the Broker's system, find the details of each content for sale, view the details, modify them, save them, and so on. Thus, dispensing with a Price List doesn't mean only avoiding database operations at the Broker, but rather completely eliminating a whole price list controller system, complete with interface. By using these price list controller systems, a big web site with hundreds of pages selling content may need to maintain many megabytes of price information in a Price List. And this information may change all the time, demanding more megabytes of log operations, specialized software, and communication overhead to give access to web site owners. An extensive interface can be completely or almost completely eliminated by some of the described or similar embodiments. Apart from that, since the Broker doesn't need necessarily to maintain maybe thousands of updated Price Lists of thousands of different Vendors, the Broker economizes a considerable amount of disk storage.

In other systems where the Vendor (instead of the Broker) maintains and checks its own Price List, the Vendor also economizes disk storage, but in this case it is less critical since it needs only to store its own Price List, while the Broker had to store many, one for each Vendor. But in the first embodiment, the Vendor doesn't need any database operation at all to accept an Authorization and grant access to the User since all necessary information is sent real-time from the User (apart from the Vendor's ID and the Broker's secret key to the Vendor, but these can both be kept in RAM, random access memory). So the Vendor doesn't need even to install any database software, making its operation very lightweight. Also, for the Vendor, it is more complicated to maintain a structured Price List of maybe millions of different items, than to simply embed Payment Information in paid-links (or by other suitable ways), and then dispense with maintaining a structured list. So, the conclusion is that the database overhead is also very low.

To summarize, since the various embodiments may decrease communication, cryptographic and database overheads over presently known systems, they enable payment systems that present lower transaction costs. The various embodiments effect different efficiency improvements, with some effecting more and others less.

While all the exemplary embodiments in the present text are described in sufficient detail to enable those skilled in the art to make and use them, other embodiments may be realized, and logical and structural changes may be made without departing from the spirit and scope of the method. Accordingly, the scope of the method should be determined, not by the embodiments illustrated, but by the appended claims, and their legal equivalents. Thus, the detailed description presented is for purposes of illustration only and should not be considered limiting.

I claim:

1. A computer-implemented method whose steps are accomplished by digital computers or mobile phones connected to an electronic communications network, for conducting internet payment operations between a user, a vendor, and a broker, including:
    (a) said vendor or said broker making available to said user payment information related to content, including a price; said vendor or said broker, by using a vendor's secret key which is known by the vendor, generating a vendor's security code comprising a message authentication code or digital signature of information comprising said payment information; said vendor or said broker providing said user with said vendor's security code;
    (b) said user or said vendor or said broker initiating a transaction, and said user sending to said broker information comprising said vendor's security code, plus a user's identification, plus said price, plus a vendor's identification; said broker, by using an authorization's secret key, generating a message authentication code or digital signature of information comprising a part of said transaction information, said vendor's security code, said price and said vendor's identification; said broker generating an authorization comprising said part of said transaction information, plus last said message authentication code or digital signature; said broker sending said authorization to said user;
    (c) said user requesting said content from said vendor; said vendor receiving said authorization plus a part of said payment information from said user; said vendor performing a verification procedure comprising generating a probative payment information, then generating a probative vendor's security code, then generating a probative part of transaction information, then generating a probative authorization; said probative payment information comprising said part of said payment information that said vendor received from said user; said probative vendor's security code comprising, by using said vendor's secret key, generating a message authentication code of information comprising said probative payment information; said probative part of transaction information comprising said probative vendor's security code, plus a part of said probative payment information, plus parts of said authorization; said probative authorization comprising, by using said authorization's secret key, generating a message authentication code of information comprising said probative part of transaction information; and if said probative authorization matches said authorization and said authorization is valid, causing said vendor to grant access to said content to said user.

2. The method of claim 1 wherein said vendor's secret key is known only by said vendor, and is not known by said broker or by said user.

3. The method of claim 1 wherein said part of said transaction information consists of a timestamp.

4. The method of claim 1 wherein said payment information is made available by using a paid link, and said payment information is included directly in the hypertext markup language of said paid link.

5. The method of claim 1 wherein said authorization is sent from said user to said vendor by using cookies.

6. The method of claim 1 wherein said content is identified by a uniform resource locator.

7. The method of claim 1 wherein said user requests said content by using a hypertext transfer protocol request, and said vendor's identification is read from the hypertext transfer protocol referrer of said hypertext transfer protocol request.

8. The method of claim 1 wherein said vendor's identification is inferred from an identification of the content.

9. A computer-implemented method whose steps are accomplished by digital computers or mobile phones connected to an electronic communications network, for conducting internet payment operations between a user, a vendor, and a broker, including:
- (a) said vendor or said broker making available to said user payment information related to content; said vendor or said broker, by using a broker's secret key which is known by the broker, generating a broker's security code comprising a message authentication code or digital signature of information comprising said payment information; said vendor or said broker providing said user with said broker's security code;
- (b) said user or said vendor or said broker initiating a transaction, and said user sending to said broker information comprising said broker's security code, plus a user's identification, plus said payment information; said broker generating a probative broker's security code comprising, by using said broker's secret key, generating a message authentication code or digital signature of information comprising said payment information; if said probative broker's security code matches said broker's security code, then said broker, by using said broker's secret key or by using a secret key shared by said broker and by said vendor, generating a message authentication code or digital signature of information comprising a part of said transaction information and said payment information; if said probative broker's security code matches said broker's security code, then said broker generating an authorization comprising said part of said transaction information, plus last said message authentication code or digital signature; said broker sending said authorization to said user or to said vendor;
- (c) said user requesting said content from said vendor; said vendor receiving said authorization plus a part of said payment information from said user or from said broker; said vendor performing a verification procedure comprising generating a probative payment information, then generating a probative part of transaction information, then generating a probative authorization; said probative payment information comprising said part of said payment information received from said user or from said broker plus a part of said payment information the vendor already has; said probative part of transaction information including said probative payment information plus the parts of said transaction information that are also parts of said authorization; said probative authorization including, by using said broker's secret key or using said secret key shared by said broker and by said vendor, generating a message authentication code or digital signature of information comprising said probative part of transaction information plus parts of said authorization; and if said probative authorization matches said authorization and said authorization is valid, causing said vendor to grant access to said content to said user.

10. The method of claim 9 wherein said payment information is made available by using a paid link, and said payment information is included directly in the hypertext markup language of said paid link.

11. The method of claim 9 wherein said authorization is sent from said user to said vendor by using cookies.

12. The method of claim 9 wherein said content is identified by a uniform resource locator.

* * * * *